(12) United States Patent
Jeong et al.

(10) Patent No.: US 10,694,201 B2
(45) Date of Patent: Jun. 23, 2020

(54) IMAGE PROCESSOR, IMAGE PROCESSING SYSTEM INCLUDING IMAGE PROCESSOR, SYSTEM-ON-CHIP INCLUDING IMAGE PROCESSING SYSTEM, AND METHOD OF OPERATING IMAGE PROCESSING SYSTEM

(71) Applicant: Samsung Electronics Co., Ltd., Suwon-si (KR)

(72) Inventors: Kyung-ah Jeong, Seoul (KR); Sun-young Shin, Yongin-si (KR); Jin-hong Oh, Hwaseong-si (KR)

(73) Assignee: SAMSUNG ELECTRONICS CO., LTD., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 54 days.

(21) Appl. No.: 16/009,710

(22) Filed: Jun. 15, 2018

(65) Prior Publication Data

US 2018/0295373 A1 Oct. 11, 2018

Related U.S. Application Data

(62) Division of application No. 14/820,566, filed on Aug. 7, 2015, now Pat. No. 10,015,502.

(30) Foreign Application Priority Data

Aug. 21, 2014 (KR) .................. 10-2014-0109039

(51) Int. Cl.
*H04N 19/426* (2014.01)
*H04N 9/79* (2006.01)
(Continued)

(52) U.S. Cl.
CPC ............. *H04N 19/426* (2014.11); *H04N 9/79* (2013.01); *G09G 5/393* (2013.01); *H04N 19/44* (2014.11); *H04N 19/86* (2014.11)

(58) Field of Classification Search
CPC ........ H04N 19/426; H04N 9/79; H04N 19/44; H04N 19/86; G09G 5/393
See application file for complete search history.

(56) References Cited

U.S. PATENT DOCUMENTS

| 5,982,359 A | 11/1999 | Kodama | |
| 6,414,689 B1 * | 7/2002 | Wu | ........................... G06F 3/14 |
| | | | 345/537 |

(Continued)

FOREIGN PATENT DOCUMENTS

| JP | 2003-283774 | 10/2003 |
| KR | 10-0840379 | 6/2008 |
| WO | 2010-021705 A1 | 2/2010 |

OTHER PUBLICATIONS

"SMIA 1.0 Part 1:Functional Specification" ST & Nokia.
(Continued)

*Primary Examiner* — Joseph Suh
(74) *Attorney, Agent, or Firm* — Muir Patent Law, PLLC

(57) ABSTRACT

A method of processing image data comprises processing a frame of image data comprising a plurality of pixels, each having corresponding pixel values. Each of the pixel values include a first and second set of bits that may be separately or simultaneously accessed and/or processed. The first set of bits may correspond to the more significant bits of each pixel and the second set of bits may correspond to the less significant bits. In some examples the number of bits in each of the first and second set of bits may correspond to the width of a used data bus and/or features of a peripheral device connected to the image processor, such as a display.

18 Claims, 22 Drawing Sheets

(51) Int. Cl.
*H04N 19/44* (2014.01)
*H04N 19/86* (2014.01)
*G09G 5/393* (2006.01)

(56) References Cited

U.S. PATENT DOCUMENTS

| | | | | |
|---|---|---|---|---|
| 6,476,934 B1* | 11/2002 | Ilbery | | G06K 15/02 |
| | | | | 345/616 |
| 6,944,221 B1 | 9/2005 | Keesman | | |
| 7,145,567 B2* | 12/2006 | Porchet | | H04N 5/926 |
| | | | | 345/543 |
| 8,106,980 B2 | 1/2012 | Jeong | | |
| 8,311,126 B2 | 11/2012 | Lavelle et al. | | |
| 8,345,739 B2* | 1/2013 | Lee | | H04N 19/176 |
| | | | | 375/240 |
| 8,411,970 B2 | 4/2013 | Thakkar | | |
| 8,564,612 B2* | 10/2013 | Dyke | | G09G 5/363 |
| | | | | 345/605 |
| 2003/0123555 A1 | 7/2003 | Kim | | |
| 2007/0076009 A1 | 4/2007 | Porchet et al. | | |
| 2007/0153013 A1* | 7/2007 | Wells | | H04N 19/61 |
| | | | | 345/549 |
| 2008/0068231 A1* | 3/2008 | Kuhns | | H04N 19/426 |
| | | | | 341/51 |
| 2009/0051817 A1* | 2/2009 | Chen | | H04N 1/58 |
| | | | | 348/625 |
| 2009/0129685 A1* | 5/2009 | Miyasaka | | G09G 5/00 |
| | | | | 382/232 |
| 2009/0324127 A1* | 12/2009 | Budagavi | | G06K 9/0061 |
| | | | | 382/275 |
| 2011/0154426 A1 | 6/2011 | Doser et al. | | |
| 2011/0229040 A1* | 9/2011 | Thakkar | | G06F 16/51 |
| | | | | 382/190 |
| 2011/0293003 A1* | 12/2011 | Luo | | G06T 5/009 |
| | | | | 375/240.12 |
| 2012/0081566 A1* | 4/2012 | Cote | | H04N 5/2256 |
| | | | | 348/222.1 |
| 2012/0113271 A1* | 5/2012 | Haraguchi | | G06F 9/3861 |
| | | | | 348/207.1 |
| 2012/0262467 A1* | 10/2012 | Yu | | H04N 7/0105 |
| | | | | 345/531 |
| 2012/0262475 A1* | 10/2012 | Frank | | G09G 5/02 |
| | | | | 345/597 |
| 2013/0170750 A1 | 7/2013 | Thakkar | | |
| 2014/0063032 A1* | 3/2014 | Chen | | G09G 5/39 |
| | | | | 345/545 |
| 2014/0177730 A1* | 6/2014 | Chang | | H04N 19/105 |
| | | | | 375/240.25 |
| 2015/0036736 A1* | 2/2015 | Lundberg | | H04N 19/503 |
| | | | | 375/240.02 |
| 2015/0156511 A1* | 6/2015 | Lundberg | | H04N 19/44 |
| | | | | 375/240.12 |
| 2015/0379970 A1* | 12/2015 | Albrecht | | G09G 5/393 |
| | | | | 345/214 |
| 2017/0178278 A1* | 6/2017 | Drabinski | | G06F 9/328 |

OTHER PUBLICATIONS

GB Patent Office Search Report dated Jan. 29, 2016 for patent application No. GB1514742.4.
First Office Action dated Sep. 3, 2019 for corresponding Chinese patent application No. CN 201510519170.5.

* cited by examiner

IMAGE PROCESSOR, IMAGE PROCESSING SYSTEM INCLUDING IMAGE PROCESSOR, SYSTEM-ON-CHIP INCLUDING IMAGE PROCESSING SYSTEM, AND METHOD OF OPERATING IMAGE PROCESSING SYSTEM

CROSS-REFERENCE TO RELATED APPLICATIONS

This application is a Divisional of U.S. patent application Ser. No. 14/820,566 filed on Aug. 7, 2015, which claims the benefit of Korean Patent Application No. 10-2014-0109039 filed on Aug. 21, 2014, in the Korean Intellectual Property Office, the disclosure of each of these applications herein being incorporated by reference in its entirety.

BACKGROUND

The inventive concept relates to an image processor, and more particularly, to an image processor, an image processing system including the image processor, a System-on-Chip (SoC) including the image processing system, and a method of operating the image processing system.

With the development and popularization of hardware capable of playing and storing high-resolution or high-quality images, it is necessary to efficiently process high-resolution or high-quality image signals. In processing an image signal, an image processor may receive an image signal to be processed and output a processed image signal. The image signal to be processed or the processed image signal may be stored in and read from a memory through a system bus.

Each pixel included in the image signal may include multi-bit pixel data, and the number of transmitted/received bits may vary depending on signal processing features. Such a variable-bit image signal needs to be efficiently transmitted between processors.

SUMMARY

The disclosure provides an image processor that efficiently processes a variable-bit image signal, an image processing system including the image processor, a System-on-Chip (SoC) including the image processor, and a method of operating the image processor and image processing system. In some examples, a codec module may be used to encode or decode an image generated by a CMOS image sensor (CIS). The codec module may receive and decode an encoded image, and the decoded image may represent a plurality of pixels. Each of the pixels may have a pixel value and each pixel value may be represented by a plurality of bits, including a plurality of first bits and a plurality of second bits. The first and second bits of all the pixels may represent an image frame. The image frame may be of a still image or part of a moving image (e.g. comprising a video signal).

An application processor (AP) may control the storage and reading (i.e. data accesses) of the pixel values and also certain processing operations on the pixel values (e.g. compression, dithering, inverse-dithering, encoding/decoding, and the like). A memory controller may be used to respond to commands by storing-into and reading-from a memory the first and second bits of each pixel value of an image (e.g. a decoded image).

The first and second bits of each pixel value may represent different portions of a pixel value. For example, the first bits may be the more significant bits and the second bits may be the less significant bits of each corresponding pixel value. The memory controller may access from a memory only the first bits of pixel value of the plurality of pixels in a first operation. In a second operation, the memory controller may access from the memory the first bits and the second bits of the plurality of pixels. The first bits may be stored in and subsequently read from the memory at locations identified by first addresses and the second bits may be stored in and subsequently read from the memory at locations identified by second addresses.

The codec module may perform a dithering operation on the first and second bits of each pixel value of a decoded image.

A bus may transfer pixel data between the different functional (e.g. image processing) blocks of an application processor. The bus may be configured to support transfers of the first and second bits of each pixel value, including after any signal processing on the first and second bits that changes their value (e.g. after a dithering operation). The bus may have a data width to support M bits that may correspond to the first bits before or after signal processing. The width of the bus may be M bits or a multiple of M (e.g. where M=8 the bus width may be 8, 16, 32, 64, 128 bits, etc.) and a positive integer K may represent such a multiple. The memory controller may control access of the first bits of K pixel values in a single, parallel of the bus, and K may have a value greater than or equal to 1.

When the memory controller stores in the memory (e.g. an embedded memory embedded in the SoC or an external memory off-chip) at first and second addresses of the memory the first and second bits of the pixel values, the addresses may be used to identify a minimum accessible unit of the memory. The minimum accessible unit of the memory may be M bits, where M is a positive integer. The number of N bits may also be a positive integer and less than M. The N bits may pertain to a single pixel value and controllers of the memory (e.g. a memory controller) may combine a plurality of N bits (e.g. of a plurality of pixels) to form the minimum accessible unit. The combined pixels may be adjacent to each other relative to the image frame.

The M bits may be stored in first locations of a first region of a memory, and the N bits may be stored in second locations of a second region of the memory. The memory locations containing the M and N bits may be addressable with the first and second addresses, respectively.

The CMOS image sensor (CIS) may generate a first image, including a plurality of first pixel values for a plurality of pixels that represent the first image. Each of the first pixel values may include first bits and second bits. Where the first and second bits are processed, e.g. by a codec module, a result may be a second pixel value. The first bits may correspond to the second pixel value and the second bits may correspond to the first pixel value. The sensed first image may be communicated to a central processing unit of the Application Processor or another device for subsequent processing via a preconfigured interface.

The processor or codec module may have the flexibility to alter the number of first and second bits of each pixel value, depending on the width of the bus. The image processing SoC may therefore be placed in different systems (e.g. mounted in different packages and on different boards) due to this configurability.

Upon being read from the memory, the first bits of the second image data and the second bits of the first image data may be re-processed (e.g. inverse dithering) and repackaged by the codec module to generate a reference image substantially the same as the original, decoded image from the CIS.

A semiconductor SoC may further comprise a display controller and a dithering unit. The dithering unit may dither a decoded image comprised of a plurality of pixels to create M dithered bits and N undithered bits for each pixel, N being a positive integer less than M. The memory controller may store in a memory the M dithered bits and N undithered bits of a plurality of pixels corresponding to the decoded image. A bus may provide communication between the memory, the memory controller, the codec module, and a processor, where the bus width may be K×M, K and M being positive integers greater than 1. The processor, codec, memory controller, or another functional block of the SoC may access sets of the M dithered bits and N undithered bits in the memory using addresses of the memory. Such accesses may comprise reception of the M dithered bits of K pixel values in parallel on the bus. A display controller may provide just the M dithered bits to a display or additionally the N undithered bits of a plurality of pixels. The display controller may provide the M and N bits to the display via a predetermined interface.

Similar to the image processing SoC of other embodiments each of the addresses of the memory may identify a minimum accessible unit of the memory, the minimum accessible unit of the memory being, e.g., M bits. The processor, codec, memory controller, or other functional block may also access the N undithered bits of a plurality of pixels over the bus by means of the minimum accessible unit of the memory. The memory may be formed within the same chip as the semiconductor SoC or the memory may be formed in different chip(s).

In certain embodiments of the semiconductor SoC some inner processing blocks of the codec module may be bypassed (e.g. the dithering circuit) such that P unprocessed (e.g. undithered) bits and N unprocessed bits are provided to the memory for each pixel to be stored, where P is a positive integer greater than or equal to M.

The semiconductor SoC performing image processing may be part of a larger image processing system. The system may include a CMOS image sensor (CIS) that may generate a frame of a first image data comprising a plurality of pixels each having a pixel value including M first bits of the first image data and N second bits of the first image data, the M first bits being the more significant bits of the pixel value and the N second bits being the less significant bits of the pixel value as compared to the M first bits. A processor may also be included that may perform a signal processing operation on the first image data to generate M third bits of a second image data and N fourth bits of the first image data. A memory controller may also be included in the system to store the M third bits of the second image data and N fourth bits of the first image data to a memory. The memory may be external to the SoC.

A display device and a display control module may also be included in the system such that the display controller may provide at least the M third bits of the second image data to the display device; depending on the display device the display controller may also flexibly provide the N fourth bits of the first image data. The display device may therefore process the M third bits of the second image (e.g. or additionally the N fourth bits of the first image data) to displays a screen according to the processed second image data. The display device may implement a color depth/gray scale by M fourth bits per pixel. The display control module may support this operation by selectively accessing a first region of the memory and providing the M fourth bits per pixel corresponding to the second image data in the first region of the memory to the display device. Similarly, depending on the display device, the display device may implement a color depth/gray scale by M fourth bits and N third bits and therefore the display control module may provide (M+N) bits from both a first and second region of the memory by providing first and second addresses, respectively. The number of bits represented by each of the M and N variables may be configurable (e.g. by a user via a processor). In different embodiments of the image processing system the display controller may selectively transmit M-bit or (M+N)-bit image data to the display device, flexibly depending on the type of display in the system.

The M third bits of the second image data may be accessible at first locations of the first region of the memory, and the N fourth bits of the first image data may be accessible at second locations of a second region of the memory. For example, the memory controller may read and provide pixel values of the second image data to the processor, which may be a codec module. The codec module may perform a dithering operation before the second image data is stored in the memory, and the codec module may perform an inverse dithering operation after reading the second image data from the memory. The codec may flexibly operate on pixels of the image data of varying bit widths.

Each of the first locations may store only M third bits of only one pixel value of the second image data at a first address. Each of the second locations may store plural sets of N fourth bits of plural pixel values of the first image data at a second address. Controllers of the memory may simultaneously store the M third bits of the second image data into the first locations of the first region of the memory while storing the N fourth bits of the first image data into the second locations of the second region of the memory. Each of the first addresses and second addresses may identify a minimum accessible memory unit of the memory.

A bus within the image processing system for data accesses of the second image data (e.g. including N third bits of the first image data) may be of a variable bit-width, e.g. the bus may have a bit-width of K×M bits, where K is a positive integer. K may be an integer equal to or greater than 2. Accesses on the bus may be performed in parallel, e.g. of K sets of M third bits of corresponding M pixel values of second image data.

In data accesses in the image processing system, pixel values of a frame of the first image data and corresponding ones of pixel values of a frame of the second image data may be the same (e.g. N second bits of the first image data may be substantially the same as N fourth bits of the first image data).

A processor of the image processing system may determine the number of bits of the M and N variables with reference to architecture information of the image processing system, e.g. where the architecture information is related to a width of the bus. In some embodiments M may be determined to be 8 and N may be determined to be 2. M may be a multiple of 8 bits.

In some embodiments the image processing SoC may include an application processor, which may include a codec module configured to receive and decode an encoded image. The decoded image may be represented as a plurality of pixels, each pixel having a pixel value comprised of a plurality of bits, including first bits and second bits. The codec module may include a dithering unit configured to perform a dithering operation on the decoded image. The memory controller may be configured to access from a memory only the first bits of pixel data of the plurality of pixels in a first operation, and may be configured to access from the memory the first bits and the second bits of the plurality of pixels in a second operation. The SoC may include a display interface configured to communicate with a display, and may also include a display controller configured to communicate with a display via the display interface. The display controller may be configured to transmit to the display interface, in a first mode, a first number of the bits of the pixel value of each of the plurality of pixels, and to transmit to the display interface, in a second mode, a second number of the bits of the pixel value of each of the plurality of pixels.

An image processing system may include a SoC, substantially as configured in the above embodiments. The image processing system may additionally include a CMOS image sensor, a display, and a memory. Additional embodiments may comprise methods of operating an image processor, methods of operating a SoC the image processor resides in, and still others may comprise methods of operating the image processing system.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EMBODIMENTS

Figure 1:
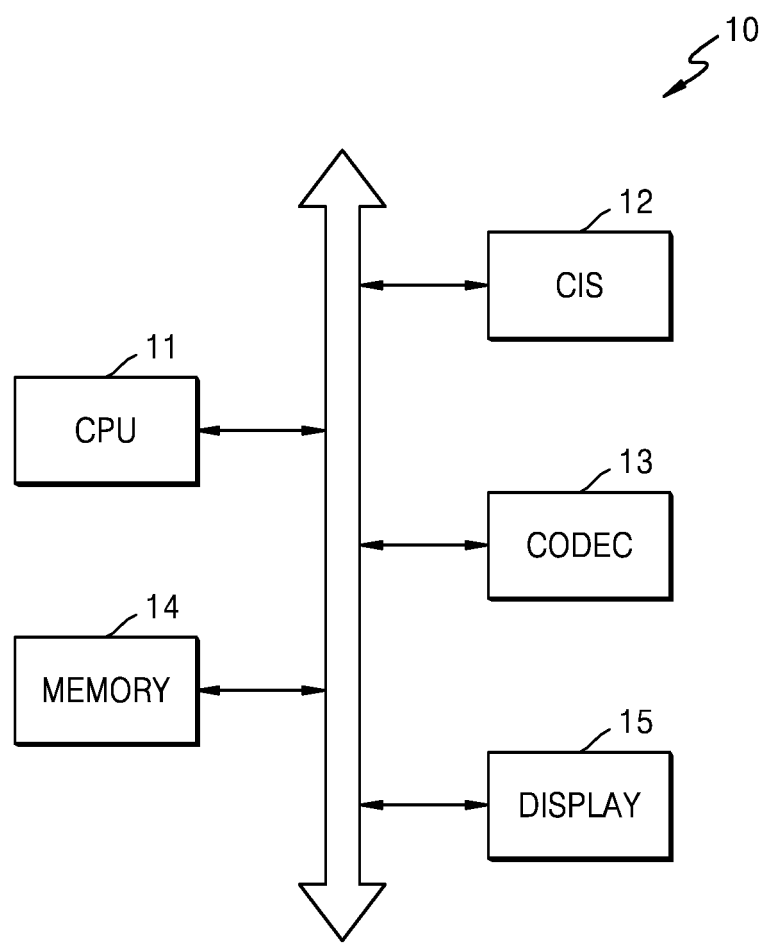
FIG. 1 is a block diagram of an example of a system including an image processor according to an embodiment of the inventive concept.

As used herein, the term "and/or" includes any and all combinations of one or more of the associated listed items. Expressions such as "at least one of," when preceding a list of elements, modify the entire list of elements and do not modify the individual elements of the list.

Hereinafter, embodiments of the inventive concept will be described in detail with reference to the accompanying drawings. The inventive concept may, however, be embodied in many different forms and should not be construed as being limited to the embodiments set forth herein. While the inventive concept is susceptible to various modifications and alternative forms, specific embodiments thereof are shown by way of example in the drawings and will herein be described in detail. These exemplary embodiments are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. It should be understood that the inventive concept is not limited to the particular forms described and covers all modifications, equivalents, and alternatives falling within the spirit and scope of the inventive concept. Like reference numerals denote like elements throughout the specification and drawings. In the drawings, the dimensions of structures are exaggerated for clarity of the inventive concept.

It will be understood that, although the terms first, second, third etc. may be used herein to describe various elements, components, regions, layers and/or sections, these elements, components, regions, layers and/or sections should not be limited by these terms. Unless the context indicates otherwise, these terms are only used to distinguish one element, component, region, layer or section from another element, component, region, layer or section, for example as a naming convention. Thus, a first element, component, region, layer or section discussed below in one section of the specification could be termed a second element, component, region, layer or section in another section of the specification or in the claims without departing from the teachings of the present invention. In addition, in certain cases, even if a term is not described using "first," "second," etc., in the specification, it may still be referred to as "first" or "second" in a claim in order to distinguish different claimed elements from each other.

The terms used herein are for the purpose of describing exemplary embodiments only and are not intended to limit the inventive concept. As used herein, the singular forms "a", "an", and "the" are intended to include the plural forms as well, unless the context clearly indicates otherwise. It will be understood that terms such as "comprise", "include", and "have", when used herein, specify the presence of stated features, integers, steps, operations, elements, components, or combinations thereof, but do not preclude the presence or addition of one or more other features, integers, steps, operations, elements, components, or combinations thereof.

Unless otherwise defined, all terms (including technical and scientific terms) used herein have the same meaning as commonly understood by one of ordinary skill in the art to which the inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. The specification may refer to portions of the embodiments as modules, units, blocks, etc. It should be understand that these modules, units and blocks are electronic circuits, which may comprise processors, controllers, digital signal processors, dedicated hardware, e.g., that may or may not be configured with software.

FIG. 1 is a block diagram of an example of a system including an image processor, according to an embodiment of the inventive concept. The system of FIG. 1 may correspond to various systems including an image processor. For example, the system of FIG. 1 may correspond to various mobile apparatuses such as digital cameras, portable camcorders, and smart phones. Hereinafter, it is assumed that the system of FIG. 1 is a mobile apparatus 10, but the invention is not limited to a mobile device.

As illustrated in FIG. 1, the mobile apparatus 10 may include a central processing unit (CPU) 11, a complementary metal-oxide-semiconductor (CMOS) image sensor (CIS) 12, a codec module 13, a memory 14, and a display device 15. Various functional blocks included in the mobile apparatus 10 may exchange signals with each other. FIG. 1 illustrates that the various functional blocks share a bus. However, embodiments of the inventive concept are not limited thereto, and some functional blocks may exchange signals with each other through a separate signal line(s) or separate busses. The mobile apparatus 10 may include an interface configured to communicate with the display device 15, such as a touch-pad display, e.g. via a plurality of input/output signals corresponding to a standard display protocol and including signal transceivers. An interface such as this may complement or be instead of the bus. Other embodiments of the present disclosure may also include such an interface.

The codec module 13 may be a video codec module that processes video codec signals. Although not illustrated in FIG. 1, the mobile apparatus 10 may further include various other functional blocks that perform other functions. For example, when the mobile apparatus 10 performs a communication function, the mobile apparatus 10 may further include a communication module. Also, the mobile apparatus 10 may further include a power management module, a clock module, or a graphics processing unit (GPU).

The image processor, according to an embodiment of the inventive concept, may be referred to as various modules that receive an image signal, process the image signal, and provide the processed result of the image signal. For example, among the function blocks illustrated in FIG. 1, the functional block(s) receiving or providing an image signal may be a processor, e.g. an image processor. The CIS 12 generates an image signal and provides the image signal to other functional blocks, the codec module 13 encodes/decodes the image signal, the memory 14 stores the image signal, and the display device 15 processes the image signal and includes a display (e.g., a screen) to display an image in accordance with the processed image signal.

The codec module 13, other functional blocks illustrated in FIG. 1, and other functional blocks not illustrated in FIG. 1 may be implemented as a System-on-Chip (SoC) and integrated in one semiconductor chip or may be implemented in plural semiconductor chips that are connected to be in communication with one another (such as within a package and/or on a printed circuit board). Also, the apparatus or system performing of FIG. 1 may be implemented in an application processor.

The CPU 11 may control an overall operation of the mobile apparatus 10. For example, the CPU 11 may execute programs and/or implement data that is stored in the memory 14 or a memory embedded in the CPU 11. The CPU 11 may include a multi-core processor, and the multi-core processor may be a computing component having two or more substantially independent processors. The multi-core processor may simultaneously drive a plurality of accelerators, and the mobile apparatus 10 including the multi-core processor may perform multi-acceleration.

The CIS 12 may include a pixel array, and each pixel included in the pixel array may include a photosensor. Each photosensor may generate an electrical signal according to the intensity of absorbed light. The CIS 12 may include a conversion unit (not illustrated) that converts the electrical signal of each pixel's photosensor into digital data to generate an image signal comprising a plurality of pixel data. This image signal captured by the CIS 12 may be encoded by the codec module 13.

The memory 14 may store various programs and an operating system (OS) related to the driving of the mobile apparatus 10. The memory 14 may also store an image signal to be processed by the codec module 13. Also, the memory 14 may store an image signal already processed by the codec module 13. In addition, the image signal generated by the CIS 12 may be provided to the memory 14, and an image signal stored in the memory 14 may be provided to the display device 15.

The codec module 13 may encode or decode various image signals generated by the mobile apparatus 10 and various image signals provided from a source external to the mobile apparatus 10. In addition, image signals (such as encoded image signals) may be provided to an external source outside of the mobile apparatus 10. Also, in a case where an encoded image signal is received from an external source, by decoding the encoded image signal, the display device 15 may display an image.

As described above, the codec module 13 may access the memory 14 in order to perform an encoding/decoding operation on an image signal. In the case of processing a moving image, an image signal may include a plurality of frame images, and each of the frame images may include pixel data regarding a plurality of pixels (such as that captured and provided by CIS 12).

The amount of information of a pixel may vary depending on the type of an image signal to be processed. For example, the pixel data of each pixel may consist of 8 bits, 10 bits, or 12 bits. For example, pixel data received from an external source and pixel data generated by different implementations of the CIS 12 may include a different amount of bits per pixel. In designing the system bus for transmitting various signals, it may be beneficial to design a data bus based on a number of bits of the pixel data. However, when the amount of information of a pixel (e.g., the number of bits per pixel) is variable, a waste of bandwidth of the data bus or an inefficient logic process may occur in performing a memory access or otherwise transmitting pixel data on the system's data bus.

It should be noted that each pixel may represent the intensity of a single color component that makes up a portion of a color pixel of a color image (or the intensity of a single pixel of a monochromatic image). A color pixel may be in fact three different single color component pixels, such as a red (R) pixel, a green (G) pixel and a blue (B) pixel that when displayed together may be seen by the human eye as one of a wide variety of colors, depending on the mixture of intensities of R, G and B light emitted from the respective R, G, B single color component pixels. The number of bits used to describe or define an intensity (e.g., an intensity of light represented on a gray scale from black to white) for a single color component pixel (e.g., the intensity of R, G or B) is called a color depth. In the examples described herein, pixels and associated pixel data refer to a single color component (e.g., one of R, G or B)—whether sensing, processing, storing or displaying—and thus the different number of bits representing a pixel value (e.g., intensity) indicate a different color depth (the range of intensities may be referred to herein as a gray scale, whether or not the image is color or monochrome). The examples described herein also contemplate monochrome (e.g., black and white) image where all pixels represent the same color and the pixel value represents the intensity of that color (e.g., black, white or a level of gray). The embodiments described herein also are applicable to color models other than an RGB color model, such as CMY (cyan, magenta, yellow), CMYK (cyan, magenta, yellow, black), etc.

According to an embodiment of the inventive concept, when an image signal is transmitted between the functional blocks through the data bus, pieces of multi-bit pixel data included in each pixel are divided and managed according to a bus width of the data bus. For example, in storing pixel data of an image signal in the memory 14, pieces of pixel data of each pixel are divided into two data groups, and pieces of pixel data of the two data groups are stored in different regions of the memory 14. Also, an image processing operation may be performed in an image signal access in order to reduce image distortion that may occur when other functional blocks (or processors) using pixel data process only pixel data stored in any one region of the memory 14. The divided pieces of each pixel may be repackaged in a subsequent image processing operation after reading from the memory 14.

In an embodiment, an image signal may include a plurality of pixels, and each of the pixels may include (M+N)-bit pixel data (hereinafter, data representing a pixel value prior to being subjected to a signal processing operation will be referred to as initial pixel data). The bit value of the pixel data may be defined variously. As one example, if the pixel data includes 10-bit data, M bits may be defined as 8 bits and N bits may be defined as 2 bits.

As an example, in an image processing operation, the codec module 13 may receive an image signal including a plurality of pixels, each pixel being represented by M+N bits of pixel data. The N bits may be the least significant bits of the pixel data and the M bits may be the more significant bits of the pixel data. In receiving and processing the (M+N)-bit pixel data, the codec module 13 may manage the upper M-bit pixel data and the lower N-bit pixel data separately. The values of M and N may be determined based on the architecture of the data bus of the system (e.g., the data bus connected to the code module 13 and/or the internal data bus of the SoC or application processor). As an example, the width of the data bus may be 8 bits or a multiple thereof. When the pixel data has 12 bits, M bits may be set to 8 bits and N bits may be set to 4 bits. As an example, when the pixel data has more bits, M bits may be set to a multiple of 8 bits (e.g., 16 bits). The value of M may be equal to L squared, where L is a positive integer.

As an example of the image processing operation of the codec module 13, the codec module 13 may perform signal processing (e.g., first signal processing) on (M+N)-bit initial pixel data to generate processed pixel data (hereinafter, data representing a pixel value after the signal processing operation will be referred to as processed pixel data). The processed pixel data may have a different amount of bits than the initial pixel data. For example, the processed pixel data may consist of M bits or more. In some examples, the processed pixel data may include the same number of bits as the initial pixel data, for example, (M+N)-bit data. In some examples, at least some of the bits of the pixel data before and after processing may be the same (e.g. the N-bit data of each of (M+N)-bit initial pixel data and processed pixel data may be the same).

In storing pixel data of each pixel of an image signal in the memory 14, at least some bits of the initial pixel data may be stored in a different region of the memory 14 than other bits of the initial pixel data. Similarly, at least some bits of the processed pixel data may be stored in different regions of the memory 14 than other bits of the processed pixel data. As an example, the upper M bits of the initial pixel data of each pixel of an image signal may be stored in a first region of the memory 14 and the lower N bits of the initial pixel data of each pixel of the image signal may be stored in a separate, second region of the memory 14. When processed pixel data of each pixel has 10-bit pixel data, the upper 8-bits of pixel data of the processed pixel data of each pixel of a processed image signal may be stored in the first (or a third) region of the memory 14 and the lower 2-bits of pixel data of the processed pixel data of each pixel of the processed image signal may be stored in the second (or a fourth) region of the memory 14. With respect to each pixel, 8-bit processed pixel data of an image signal after signal processing and 2-bit initial pixel data of an image signal (e.g., original image signal provided by CIS 12) before image processing may be stored in different regions of the memory 14. The 8-bit data may then be accessed in response to one or more commands (e.g. a read command) and the 8-bit data access may be performed according to a first address. Where the 2-bit data is also accessed, in response to one or more commands, a second address may be used.

Other functional blocks included in the mobile apparatus 10 may be provided with data from respective regions of the memory 14. For example, when the display device 15 displays an image (e.g. on a screen) by implementing a gray scale (or color depth) according to M-bit pixel data of each pixel, the processed pixel data stored in the first region of the memory 14 may be provided to the display device 15 without the need to provide corresponding N-bit pixel data. Even when an image signal includes (M+N)-bit pixel data per pixel, the display device 15 may receive only M-bit pixel data stored in the first region of the memory 14 and may display an image accordingly. Accordingly, even when the number of bits of the pixel data of the image signal is different from the number of bits of the pixel data for implementing the gray scale (or color depth) of the display device 15, the additional pieces of pixel data need not be accessed (even though such pixel data need not be discarded and may be stored in memory 14). Also, the data bus may be efficiently used when the data bus has a bandwidth equal to M bits (or equal to a multiple of M bits).

Also, in a signal processing operation of the codec module 13, a previous frame image may be used as a reference image to perform motion estimation and compensation. In this case, the image signal representing a previous frame stored in the memory 14 may be provided to the codec module 13. The previous frame stored in the memory 14 may comprise M bits of processed pixel data and N bits of initial pixel data for each pixel of the previous frame. In this example, the M bits of initial pixel data for each pixel of the previous frame may be discarded after processing (e.g., dithering), however, the N bits of initial pixel data is saved in memory 14 (the M bits of initial pixel data need not be discarded and thus may be stored in the memory if other functions or other functional blocks so require them). The codec module 13 may receive the M-bit processed pixel data and the N-bit initial pixel data read from the first and second regions of the memory 14. The codec module 13 may perform signal processing on the M-bit processed pixel data. For example, the codec module 13 may perform a signal processing operation (e.g., second signal processing) on the M-bit processed pixel data in order to restore the initial pixel data as an original image signal. The restored initial pixel data may have data of M bits or more. For example, when the restored initial pixel data has a size that is greater than M, M-bit initial pixel data may be restored by discarding the lower significant bits after the first upper M significant bits are retrieved from the memory. The codec module 13 may generate an original image signal having (M+N)-bit pixel data per pixel as a reference image by combining the restored M-bit initial pixel data and the N-bit initial pixel data read from the second region of the memory 14.

Exemplary operations of the above image processing system according to embodiments of the inventive concept will be described below.

Figure 2:
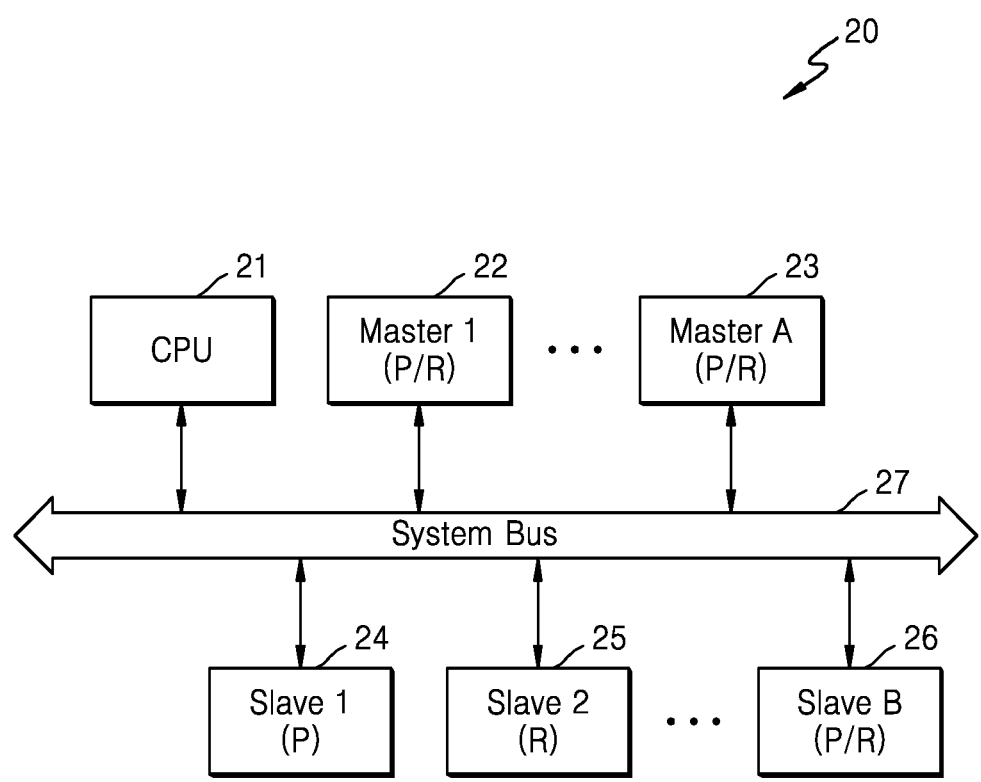
FIG. 2 is a block diagram of an example in which an image processing system according to an embodiment of the inventive concept is implemented as a System-on-Chip (SoC)

FIG. 2 is a block diagram of an example in which an image processing system according to an embodiment of the inventive concept is implemented as a System-on-Chip (SoC) 20, although the details of this embodiment are also applicable to systems within a single semiconductor package (e.g., a plurality of stacked semiconductor chips within a single package) and systems formed of multiple chips and/or packages mounted on a printed circuit board.

As illustrated in FIG. 2, the SoC 20 as the image processing system may include a plurality of intellectual property (IP) cores. The plurality of IP cores are implemented in the SoC 20 to perform their respective functions which may vary depending on the desired function of the SoC as designed. Among the plurality of IP cores, each IP core performing image processing may comprise a processor.

The SoC 20 includes a system bus 27 and IP cores connected to the system bus 27. As an example of the IP cores, the SoC 20 may include a CPU 21, master IP cores 22 and 23, and slave IP cores 24 to 26.

The system bus 27 may be a bus using a protocol having a predetermined bus standard. For example, an Advanced Microcontroller Bus Architecture (AMBA) protocol of Advanced RISC Machine (ARM) may be used as the bus standard. Bus types of the AMBA protocol may include Advanced High-Performance Bus (AHB), Advanced Peripheral Bus (APB), Advanced eXtensible Interface (AXI), AXI4, and AXI Coherency Extensions (ACE). Among the above bus types, AXI is an interface protocol between IP cores that provides a multiple outstanding address function and a data interleaving function. In addition, the system bus 27 may use other types of protocols such as uNetwork of SONICs Inc., CoreConnect of IBM, and Open Core Protocol of Open Core Protocol International Partnership (OCP-IP).

Each of the IP cores illustrated in FIG. 2 may be implemented as a functional block performing a particular operation, and the IP cores may be classified as the master IP cores 22 and 23 or the slave IP cores 24 to 26 depending on whether they have the right to use the system bus 27. The CPU 21 illustrated in FIG. 2 may also correspond to a master IP. In addition, a memory control module, a digital signal processor (DSP), and a codec module may be implemented as the master IP cores 22 and 23. The slave IP cores 24 to 26 are controlled by the master IP cores 22 and 23. An input/output module and an embedded memory may be implemented as the slave IP cores. According to the above embodiment, each of the master IP cores 22 and 23 and the slave IP cores 24 to 26 may be a processor, such as an image processor and/or form part of a processor and/or image processor.

Pixel data of an image signal may be transmitted/received through a data bus in the system bus 27, and each of the IP cores included in the SoC 20 may receive and/or provide transmit pixel data through the data bus. The IP cores may only receive or provide pixel data according to their respective functions. Also, the IP cores may receive and provide pixel data according to their respective functions. FIG. 2 illustrates an example in which the master IP cores 22 and 23 receive and provide pixel data, some of the slave IP cores 24 to 26 only receive pixel data, some of the slave IP cores 24 to 26 only provide pixel data, and others of the slave IP cores 24 to 26 receive and provide pixel data.

Each of the master IP cores 22 and 23 and the slave IP cores 24 to 26 in the SoC 20 may transmit/receive pixel data through the data bus. Also, each of the master IP cores 22 and 23 and the slave IP cores 24 to 26 in the SoC 20 may access pixel data of an external memory (not illustrated) disposed outside the SoC 20. As an example, under the control of the memory control module in the SoC 20, each of the master IP cores 22 and 23 and the slave IP cores 24 to 26 in the SoC 20 may store pixel data in the external memory and receive pixel data from the external memory.

According to an embodiment of the inventive concept, each of the master IP cores 22 and 23 and the slave IP cores 24 to 26 may manage pixel data by dividing the pieces of pixel data into at least two groups according to a bus width of the data bus (e.g. to efficiently use the entire bus width by having at least one of the groups amount to a unit number of bits substantially close to the width of the bus or a multiple of the width of the bus). When the master IP cores 22 and 23 and the slave IP cores 24 to 26 access pixel data of the embedded or external memory (e.g., store or read pixel data), they may divide the pieces of pixel data into at least two groups according to a bus width of the data bus included in the system bus 27 of the SoC 20 and store the pieces of pixel data of the at least two groups separately in at least two regions of the embedded or external memory. Alternatively, the pixel data may be divided into pieces according to a bus width of a bus (e.g. an external data bus) connected to transmit pixel data between the SoC and the external memory. When the master IP cores 22 and 23 and the slave IP cores 24 to 26 access pixel data of an embedded memory of the SoC, they may operate in substantially the same way.

Figure 3:
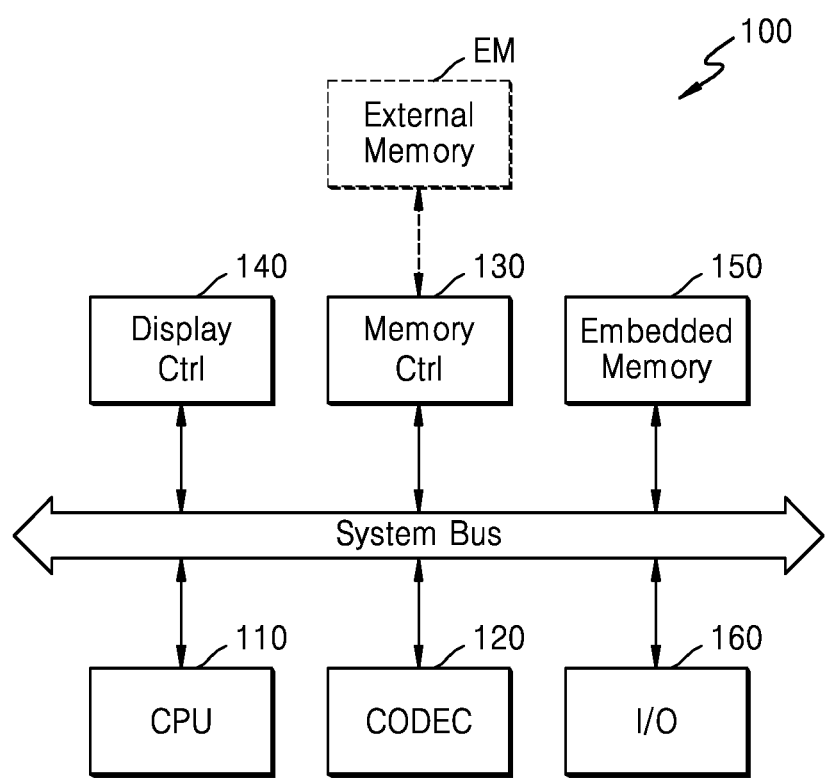
FIG. 3 is a block diagram of an SoC as an example of the SoC of FIG. 2.

FIG. 3 is a block diagram of an SoC as an example of the SoC 20 of FIG. 2. FIG. 3 also illustrates an external memory EM hat may be connected to communicate with the SoC. As illustrated in FIG. 3, the SoC 100 may include a CPU 110, a codec module 120, a memory control module 130, a display control module 140, an embedded memory 150, and an input/output (I/O) module 160. The above components may be connected through a system bus inside the SoC 100. The SoC 100 of FIG. 3 may be an application processor that may be installed in a mobile apparatus or the like. Also, as described above, the SoC 100 according to an embodiment of the inventive concept may not include some of the functional blocks illustrated in FIG. 3 or may include other functional blocks not illustrated in FIG. 3.

The embedded memory 150 is part of the SoC 100 and may store various programs, instructions, and/or data like the memory 14 (external memory) of FIG. 1. Also, the embedded memory 150 may store an image signal to be processed by the codec module 120 (e.g., initial pixel data as described herein) and an image signal processed by the codec module 120 (e.g., processed pixel data as described herein). The embedded memory 150 may be implemented by a volatile memory and/or a nonvolatile memory.

The memory control module (e.g., memory controller) 130 interfaces with an external memory EM via an interface of the SoC 100 (schematically with the dashed arrow). For example, according to an embodiment of the inventive concept, to store an image signal in the external memory EM, the memory control module 130 may perform control such that pieces of pixel data of each pixel are stored separately in at least two regions of the external memory EM. Also, the memory control module 130 may separately access at least two regions of the external memory EM. Accordingly, some of the functional blocks of the SoC 100 may exchange pixel data of any one region with the external memory EM, and other functional blocks of the SoC 100 may exchange pixel data of two or more regions with the external memory EM.

The display control module (e.g., display controller) 140 may control an operation of an external display device (not illustrated). The display controller may communicate with the display device via an interface of the SoC 100. For example, the display control module 140 may receive pixel data through the memory control module 130 and provide the pixel data to the external display device. The display control module 140 may provide the pixel data to the external display device via a dedicated display device interface of the SoC or via an interface of the SoC 100 that is shared with for use with other modules of the SoC (e.g., a shared I/O port of the SoC 100). When an image signal includes (M+N)-bit pixel data per pixel and the external display device displays a screen by implementing a gray scale/color depth according to M-bit pixel data per pixel, M-bit data stored in a region (e.g., first region) of the external memory EM or embedded memory 150 may be provided to the external display device through the display control module 140 and other pixel data stored in the external memory EM or embedded memory 150, such as N-bit pixel data representing the image, need not be sent to the display control module 140 and the external display. The display controller may be configured to transmit bits of the pixel value to the external display device via a display interface of the SoC 100. For example, in a first mode, the display controller 140 may transmit only a portion of the bits of the pixel value of each of the plurality of pixels (e.g., may transmit just M bits of (M+N)-bit pixel data for each pixel). Similarly, the display controller may transmit to the display interface, in a second mode, a second, different number of the bits of the pixel value of each of the plurality of pixels. For example, in the second mode the display controller 140 may transmit all of the (M+N)-bit pixel data for each pixel. In some embodiments, the codec module 120 may be configured to alter the values of M and N in response to the display control module 140.

According to an embodiment of the inventive concept, various functional blocks illustrated in FIG. 3, which may form an image processor, may control data access to the external memory EM or the embedded memory 150 through the memory control module 130. For example, M-bit pixel data and N-bit pixel data in (M+N)-bit pixel data may be stored at and read from different address locations of the external memory EM or embedded memory 150, and each image processor may generate an address indicating a location at which (M+N)-bit pixel data will be stored or read and provide the address to the memory control module 130. As an example, the codec module 120 may process (M+N)-bit pixel data and provide the processed (M+N)-bit pixel data to the memory control module 130. Also, the codec module 120 may generate a first address indicating a position at which M-bit pixel data will be stored or read and a second address indicating a position at which N-bit pixel data will be stored or read and provide the first address and the second address to the memory control module 130. In some embodiments, the first and second addresses when decoded may indicate the same row address for storage of the M-bit pixel data and N-bit pixel data and in other embodiments the decoded row addresses may be different. Upon reading from the external memory EM or embedded memory 150 the codec may repackage (e.g., combine) the M-bit pixel data with the N-bit pixel data.

Figure 4:
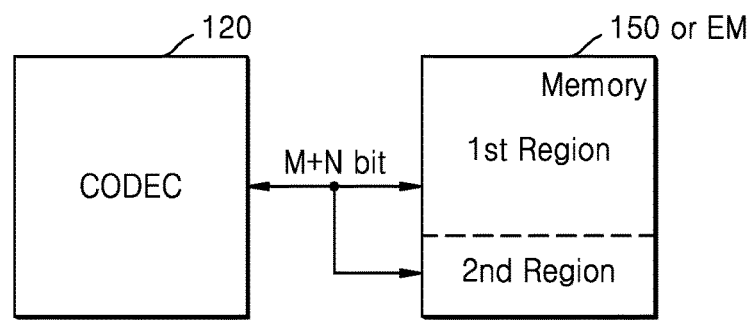
FIGS. 4 and 5 are block diagrams of an example of a pixel data transmitting/receiving operation between an image processor and a memory.
Figure 5:
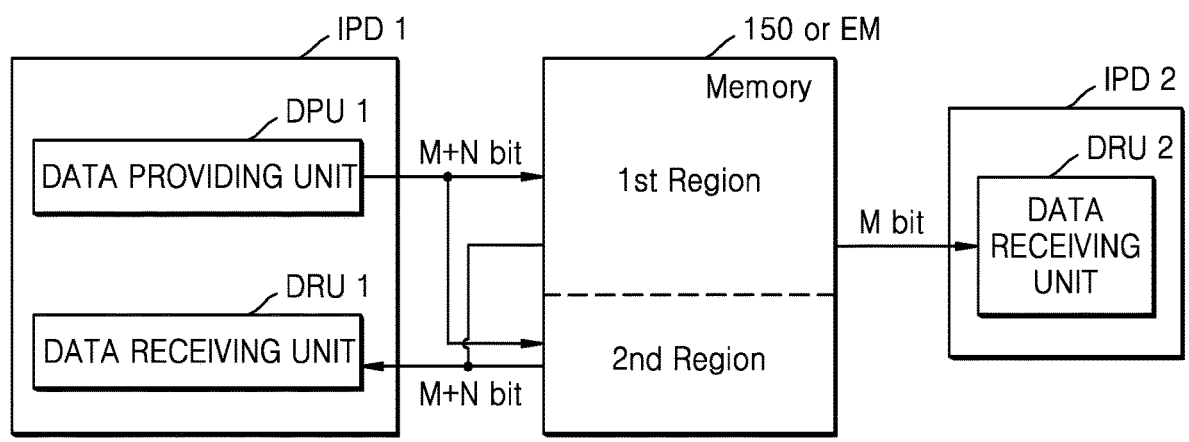

FIGS. 4 and 5 are block diagrams of an example of a pixel data transmitting/receiving operation between an image processor and a memory. In FIG. 4, a codec module 120 is illustrated as the image processor but the description is equally applicable to any functional block accessing memory 150 or external memory EM.

As illustrated in FIG. 4, the codec module 120 exchanges pixel data with the memory. For example, the codec module 120 may provide (M+N)-bit pixel data of each pixel to the memory. The memory may be the external memory EM or the embedded memory 150 illustrated in FIG. 3. Hereinafter, it is assumed that the memory of FIGS. 4 and 5 is the external memory EM but the description is equally applicable to embedded memory 150.

The external memory EM may include a first region and a second region. Also, as for (M+N)-bit pixel data provided to the external memory EM, M-bit pixel data (e.g., processed pixel data) may be stored in the first region of the external memory EM, and N-bit pixel data (e.g., initial pixel data) may be stored in the second region of the external memory EM. The first region and the second region of the external memory EM may be separately accessed. Accordingly, the first region and the second region of the external memory EM may be accessed for exchanging signals with the image processor using (M+N)-bit pixel data. Only the first region of the external memory EM may be accessed for exchanging signals with the image processor using M-bit pixel data.

As illustrated in FIG. 5, the external memory EM may be accessed by a plurality of image processors. For example, as illustrated in FIG. 5, a first image processor IPD1 may provide pixel data to the external memory EM and receive pixel data from the external memory EM. Also, a second image processor IPD2 may receive pixel data from the external memory EM. Although illustrated separately, signal lines transmitting the pixel data between IPD1 and the external memory EM may be the same (e.g., a data bus).

The first image processor IPD1 may include a data providing unit DPU1 and a data receiving unit DRU1. The data providing unit DPU1 may provide pixel data to the external memory EM, and the data receiving unit DRU1 may receive pixel data from the external memory EM. According to the above embodiment, the data providing unit DPU1 may provide (M+N)-bit pixel data of each pixel to the external memory EM. As an example, when the first image processor IPD1 corresponds to a codec module, the data providing unit DPU1 may perform signal processing on an original image signal and provide the external memory EM with M-bit processed pixel data generated as a result of the signal processing and N-bit initial pixel data before the signal processing. Also, the data receiving unit DRU1 may receive M-bit processed pixel data and N-bit initial pixel data from the external memory EM and generate (or restore) an original image signal by performing a signal processing operation on the M-bit processed pixel data and the N-bit initial pixel data.

Also, as illustrated in FIG. 5, the second image processor IPD2 may receive pixel data from the external memory EM. For example, the second image processor IPD2 may receive M-bit pixel data from the external memory EM. The second image processor IPD2 may include a data receiving unit DRU2. Accordingly, the second image processor IPD2 may selectively access the first region of the external memory EM. When the second image processor IPD2 corresponds to a display control module and the external display device implements a color depth/gray scale by M-bit pixel data per pixel, the second image processor IPD2 may receive M-bit processed pixel data stored in the first region of the external memory EM and provide the M-bit processed pixel data to the external display device.

Although not illustrated in FIG. 5, other image processors may also access the external memory EM. When the image processor processes (M+N)-bit pixel data per pixel, the image processor may access pixel data stored in the first region and the second region of the external memory EM. When the image processor processes M-bit pixel data per pixel, the image processor may selectively access pixel data stored in the first region of the external memory EM.

Figure 6:
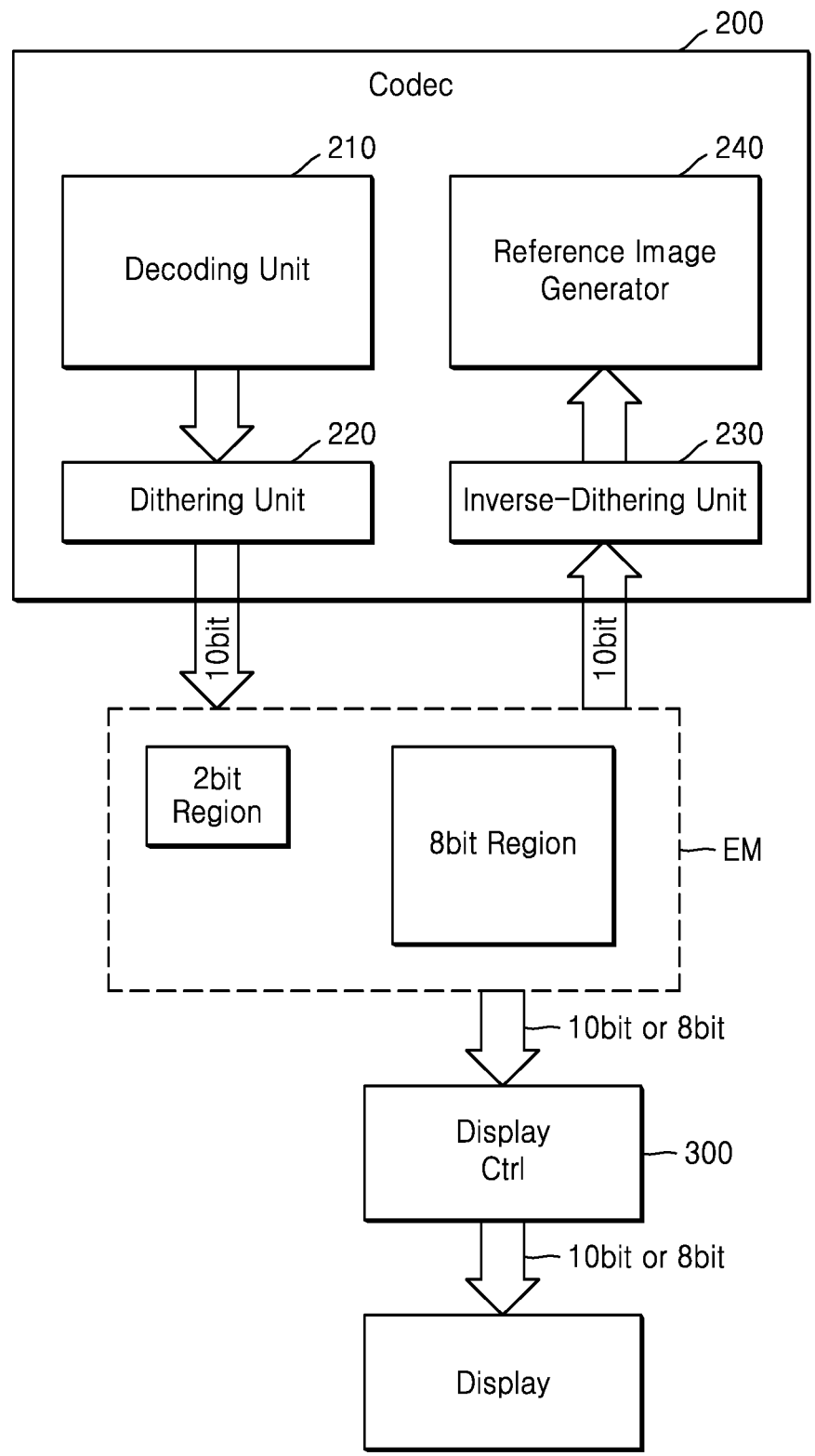
FIG. 6 is a block diagram of a codec module as an example of a codec module of FIG. 5.

FIG. 6 is a block diagram of a codec module 200 as an example of the codec module 120 of FIGS. 3 and 4. In FIG. 6, a display control module 300, a memory and a display device are further illustrated in addition to the codec module 200. Also, the memory of FIG. 6 may be the external memory EM or the embedded memory 150 illustrated in FIG. 3. Note that while the external memory EM is illustrated between the codec 200 and the display controller 300, this is to illustrate the flow of data; the display controller 300 and codec 200 may be part of the same device (e.g., SoC) with the data flow of FIG. 6 achieved by accesses to the external memory 200 by the device (e.g., SoC) for subsequent transfer to the display by display controller 300. Hereinafter, it is assumed that the memory of FIG. 6 is the external memory EM, however the description is equally applicable to embedded memory, such as 150. Also, it is assumed that, in (M+N)-bit pixel data of an image signal, M equals 8 and N equals 2.

The codec module 200 may include a data providing unit that provides pixel data to the external memory EM and a data receiving unit that receives pixel data from the external memory EM. The data providing unit may include a decoding unit 210 that decodes an encoded image signal and a dithering unit 220 that performs dithering on a decoded image signal (e.g., original image signal) generated by the decoding unit 210. Also, the data receiving unit may include an inverse-dithering unit 230 (or it may be referred to as a reconstruction unit) that restores pixel data by performing inverse-dithering on the pixel data received from the external memory EM and a reference image generator 240 that generates a reference image corresponding to the original image signal by using the restored pixel data and the pixel data received from the external memory EM.

The number of bits of the pixel that are processed in the image processing system may not be fixed. As an example, the number of bits of the pixel may vary per processing block (e.g. per functional block), and the number of bits of the pixel may vary according to circumstances even within the same processing block. For example, as illustrated in FIG. 6, the codec module 200 encoding/decoding an image signal may provide a 10-bit output per pixel, and the display device displaying an image using this output may process only a portion of the output of the codec module 200 (e.g., only 8-bits of data per pixel). Also, pixel data of a pixel of the image signal provided to the codec module 200 may be provided in various forms, such as 8 bits or 10 bits.

According to an embodiment of the inventive concept, when some functional blocks inside or outside the image processing system use 8-bit pixel data per pixel and the other functional blocks output 10-bit pixel data per pixel, the pieces of 10-bit pixel data are divided into 8-bit pixel data and 2-bit pixel data and the 8-bit pixel data and the pieces of 2-bit pixel data are stored in the external memory EM. The functional block using 8-bit data per pixel may receive only 8-bit pixel data stored in one region of the external memory EM without discarding some-bit (e.g., 2-bit) data among the read data (e.g., 10-bit). For example, the 8-bit pixel data divided from the 10-bit pixel data may be stored in the first region of the external memory EM, the 2-bit pixel data may be stored in the second region of the external memory EM, and the 8-bit pixel data stored in the first region of the external memory EM may be provided to the display device that is the image processor that processes an image signal in units of 8 bits per pixel.

Pixel data (e.g., initial pixel data) of the original image signal output from the decoding unit 210 may be provided to the dithering unit 220. For example, 10-bit initial pixel data per pixel may be provided to the dithering unit 220. The dithering unit 220 generates processed pixel data by performing dithering on the 10-bit initial pixel data by using a predetermined mask. The dithered processed pixel data may be 8-bit pixel data generated by removing the lower 2-bit data from the 10-bit pixel data, e.g. generated by operating a mask coefficient on the 10-bit initial pixel data.

The 8-bit processed pixel data and the 2-bit initial pixel data may be provided to the external memory EM. A memory controller (not shown) may facilitate data transfers to and from the external memory EM. Although FIG. 6 illustrates an example in which the 8-bit processed pixel data and the 2-bit initial pixel data are provided to the external memory EM through the dithering unit 220, embodiments of the inventive concept are not limited thereto. For example, the 2-bit initial pixel data may be directly provided to the external memory EM along an external path with respect to the dithering unit 220, and the dithering unit 220 may receive 10-bit initial pixel data of the pixel of the original image signal, generate 8-bit processed pixel data by using the 10-bit initial pixel data, and provide the 8-bit processed pixel data to the external memory EM.

According to the above embodiment, the 8-bit processed pixel data may be stored in the external memory EM or the first region of the external memory EM in the same format as a general 8-bit image. Accordingly, since the 8-bit processed pixel data stored in the first region of the external memory EM may be provided to the image processor, unnecessary information may be prevented from being stored and read and the width of the data bus transmitting pixel data may be reduced. Also, since the pieces of 8-bit processed pixel data used in the display device are dithered data, the image quality of a displayed screen may be improved even when the transmission amount of pixel data is reduced.

The 10-bit pixel data separately stored in the external memory EM (e.g., the 8-bit processed pixel data and the 2-bit initial pixel data) may be provided to the codec module 200, and the codec module 200 may generate a reference image corresponding to the original image signal by using the received 10-bit pixel data (e.g., performing inverse dithering on the received 8-bit processed pixel data and appending the received 2-bit initial pixel data). The generated restored reference image may be used by the codec module 200 at a predetermined point of time and may be used for motion estimation and compensation in a decoding operation on a next image signal (e.g., next frame) provided to the codec module 200 (e.g., from the CIS).

The inverse-dithering unit 230 may restore pixel data corresponding to the initial pixel data before the dithering processing by performing inverse-dithering on the dithered 8-bit processed pixel data. The reference image generator 240 may generate a reference image corresponding to the original image by combining the 8-bit restored initial pixel data received from the inverse-dithering unit 230 and the 2-bit initial pixel data read from the second region of the external memory EM.

The display control module (display controller) 300 may access the first and second regions of the external memory EM or only the first region of the external memory, which may depend on the mode or type of display that the display control module 300 controls. The display control module 300 may include information related to the number of bits per pixel for color depth/gray scale implementation, as information related to the display device. When the display device implements a color depth/gray scale of 8 bits per pixel, the display control module 300 may selectively access the first region of the external memory EM and provide data corresponding to 8 bits per pixel to the display device. When the display device implements a color depth/gray scale by 10 bits per pixel, the display control module 300 may selectively access the first region of the external memory EM and the second region of the external memory EM to then provide data corresponding to 10 bits per pixel to the display device.

Data accesses to and from the external memory EM may be enabled by the memory controller or the codec module 200. The memory controller or the codec module 200 may facilitate data accesses using addresses. A plurality of first addresses may correspond to memory locations of the 8-bit region and a plurality of second addresses may correspond to memory locations of the 2-bit region. Each memory location may correspond to a minimum accessible unit (e.g. 8-bits, a multiple of 8 bits, etc.), and a single first or a single second address may be used to write-to or read-from each memory location. A memory location containing the 2-bits of each pixel may contain a plurality of pixels (e.g. 4 pixels in an 8-bit minimum accessible unit of the memory).

The 8-bit and 2-bit regions may be differentiated by column addresses and thus pixels including the 8-bit portion and 2-bit portion may be stored in the same row (e.g. a word line or page). In other embodiments the 8-bit and 2-bit regions may be differentiated by rows (e.g. word lines). The regions may be stored in alternating rows or whole blocks of the memory may be used to differentiate and separate the 8-bit and 2-bit regions. The first and second addresses may identify these regions and memory locations accordingly.

Data accesses of the 8-bit and 2-bit regions may be simultaneous or sequential. For example, a data bus width used by a codec module or memory controller may be multiples of the minimum accessible unit (e.g. 64-bits, 128-bits). Multiple 8-bit portions of pixels may be accessed simultaneously in one data access. Also, multiple minimum accessible units containing 2-bit portions of the pixels may be accessed simultaneously. In other embodiments 8-bit and 2-bit portions of pixels may be accessed simultaneously in one data access.

Figure 7A:
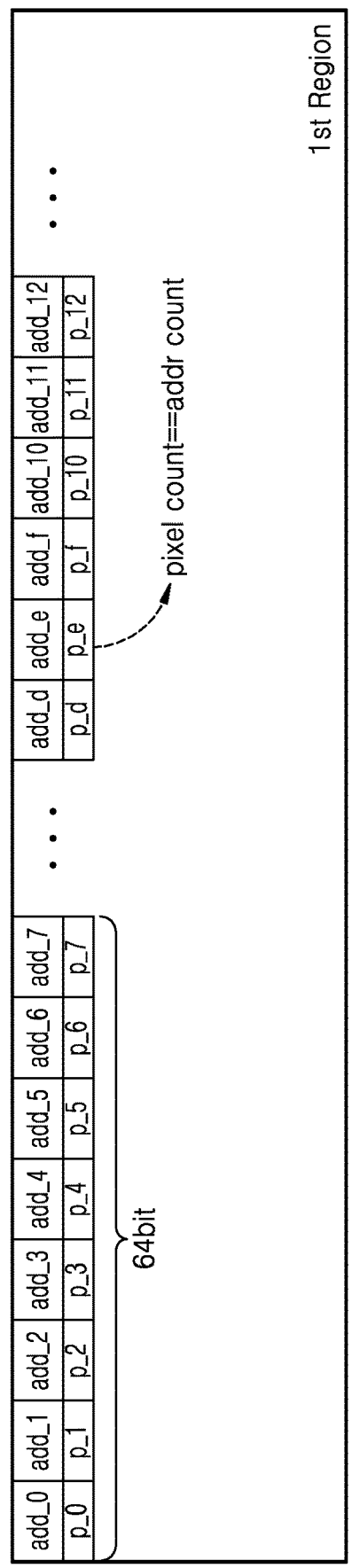
FIGS. 7A and 7B are block diagrams of an example of storing pixel data in the memory.
Figure 7B:
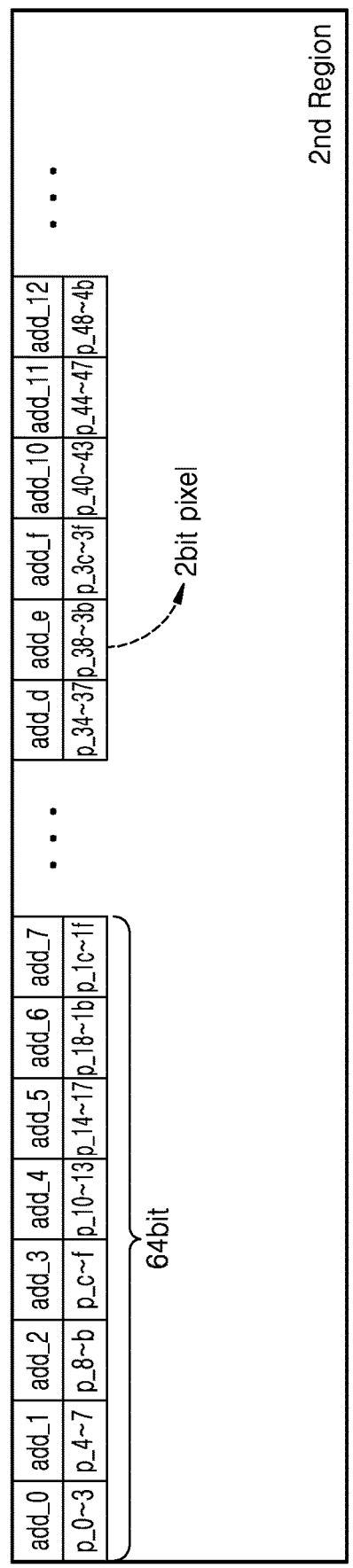

FIGS. 7A and 7B are block diagrams of an example of storing pixel data in a memory. The memory of FIGS. 7A and 7B may be an external memory disposed outside an SoC according to an embodiment of the inventive concept or an embedded memory of the SoC. Also, FIGS. 7A and 7B illustrate an example in which a memory access unit is 8 bits and 8-bit pixel data is stored and output corresponding to one address. Addresses shown in FIGS. 7A, 7B, 8A and 8B (e.g., "add 0" are column addresses. Pixel data (e.g., "p-0") represents pixel data (either 8-bit or 2-bit) associated with a corresponding column address. Pixel data arranged in a row (e.g., left to right in FIGS. 7A and 7B) are stored the same a row of memory in these examples (e.g., a word line of a DRAM, SRAM, or a page of NAND flash memory). Row addresses identifying a row of memory are not shown.

As illustrated in FIGS. 7A and 7B, since a memory data access unit is 8 bits, a data process unit of a system including a data bus may be a multiple of 8 bits. As an example, the data bus may have a bus width of 64 bits or 128 bits, a data storage position (e.g., memory map) of the memory may be constructed in units of 8 bits, and a pixel data processing logic may receive and process pixel data in units of a multiple of 8 bits. Also, according to an embodiment of the inventive concept, even when the number of bits per pixel of an image signal to be processed is 10 bits or a different number of bits, a signal processing suitable for the system based on units of 8-bit (or multiple-8-bit) is performed on the image signal.

When the pixel data has 10 bits, parts of the 10-bit pixel data may be stored separately in a first region and a second region as illustrated in FIGS. 7A and 7B. As in the above embodiment, the more significant 8-bit pixel data among the 10-bit pixel data may be stored in the first region of the memory and the other less significant 2-bit pixel data may be stored in the second region of the memory. When the image processor accessing the memory corresponds to a codec module, 8-bit processed pixel data after signal processing such as dithering may be stored in the first region of the memory and 2-bit initial pixel data of an original image signal may be stored in the second region of the memory. The 8-bit initial pixel data FIG. 7A illustrates an example in which pieces of 8-bit pixel data are stored in the first region of the memory. For example, 8-bit pixel data of a first pixel p_0 may be stored at a position of an address 0 (add_0), and then 8-bit pixel data of a second pixel p_1 may be stored at a position of an address 1 (add_1). According to this mode, 8-bit pixel data of a plurality of pixels may be stored. When the data bus has a bus width of 64 bits, pixel data of eight pixels p_0 to p_7 may be simultaneously provided to the memory through the data bus. The addresses shown in FIG. 7A may have the same row address and the pixel data shown may be sensed and latched simultaneously from the row identified by the row address. The pixels illustrated in FIG. 7A may all be stored on the same row (e.g., word line or page) and portions of the data on the row may be identified and accessed via a column address. In performing a read operation, a row address may be decoded to identify and activate a word line. Data on the word line may be sensed and latched by an array of sense amplifiers (e.g., when the memory is DRAM) or by a page buffer (e.g., when the memory is a NAND flash memory). A column address may be decoded to identify and access a portion of this sensed and latched row data. The address of the pixel data (including the row address and column address) identifies a minimal addressable unit of the memory and in this instance, identifies 8-bits of the memory that may only be accessed together from the memory (i.e., may not be separately accessed from the memory).

As illustrated in FIG. 7B, 2-bit pixel data of each pixel may be stored in the second region of the memory. Since eight pieces of pixel data are stored and read corresponding to one address, pixel data of four pixels may be stored at a minimal addressable unit of memory corresponding to one address of the second region. As an example, to store 2-bit pixel data in the second region of the memory, pixel data of first to fourth pixels p_0 to p_3 may be stored at a position of an address 0 (add_0), and then pixel data of fifth to eighth pixels p_4 to p_7 may be stored at a position of an address 1 (add_1). Corresponding to one address, 2-bit pixel data of a plurality of pixels (e.g., four pixels) may be simultaneously provided to the minimal addressable unit of the memory. According to this storage mode, 2-bit pixel data included in all pixels included in one frame image may be stored in the second region of the memory. As with FIG. 7A, the addresses shown in FIG. 7B may share a row address and the pixel data shown may be sensed and latched simultaneously from the row identified by the row address. Portions of the row data may be identified and accessed via a column address resulting in providing 2-bit data of multiple pixels.

According to the example of FIGS. 7A and 7B, data of all pixels included in one frame image may be stored in the memory. Also, since the position of the pixel and the position of the address are aligned, data of the pixels of an access target may be easily indicated by the address. Also, 2-bit pixel data of each of four pixels (8-bit data in total) may be defined as one group, and pixel data may be read in units of the defined group according to the address and transferred through an 8-bit (or multiple-8-bit) data bus. Therefore, it is possible to prevent the unnecessary occupation of the data bus that may occur due to a difference between the data unit of the pixel and the width of the data bus, including any multiples therewith.

Figure 8A:
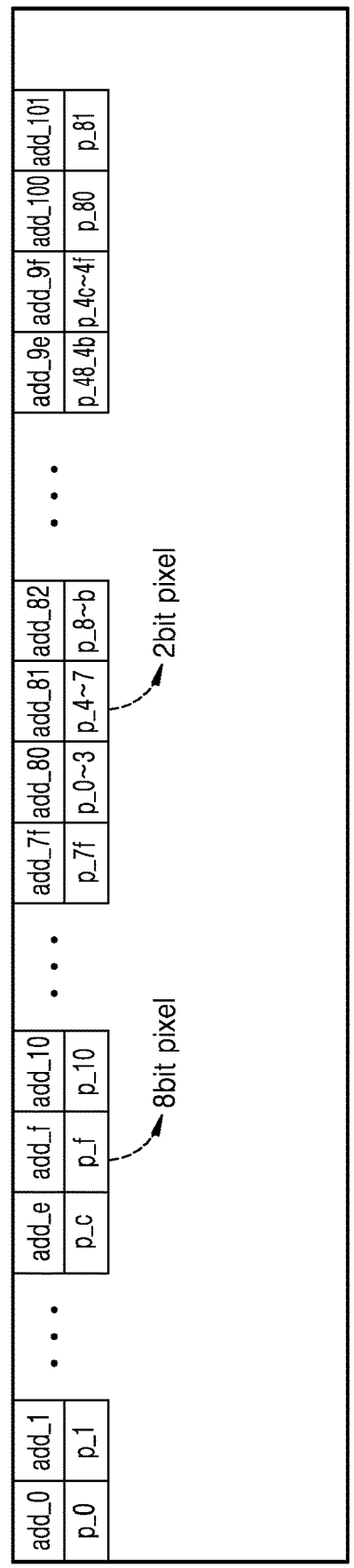
FIGS. 8A and 8B are block diagrams of another example of storing pixel data in the memory.
Figure 8B:
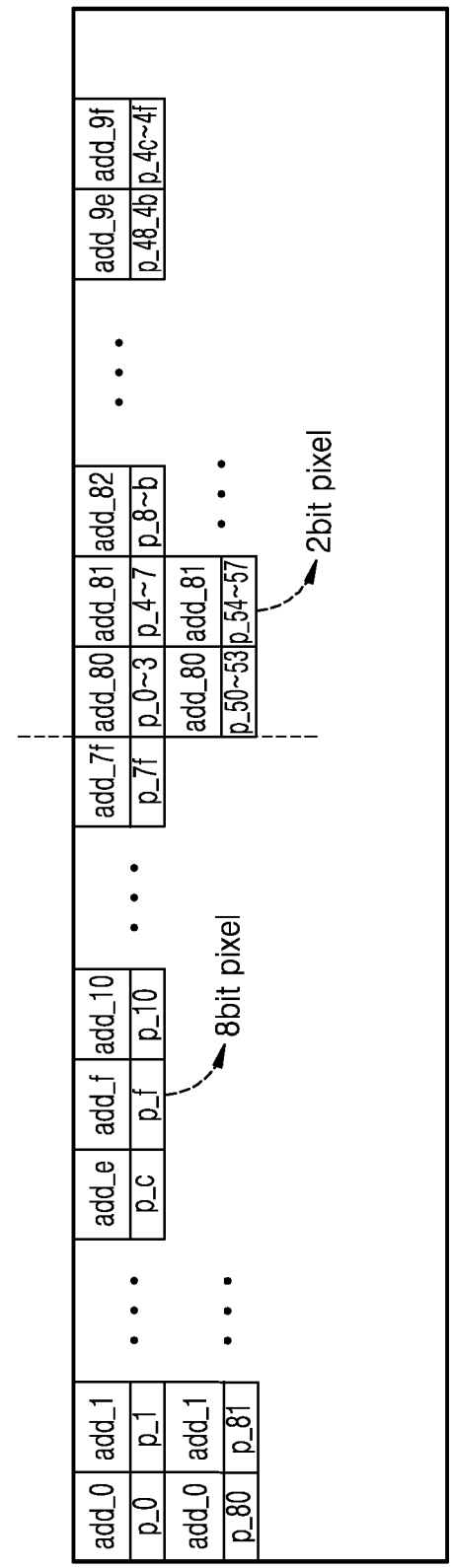

FIGS. 8A and 8B are block diagrams of another example of storing pixel data in the memory. FIGS. 8A and 8B illustrate an example of dividing 10-bit pixel data into 8-bit processed pixel data and 2-bit initial pixel data and storing the 8-bit processed pixel data and the 2-bit initial pixel data in the memory, wherein the initial pixel data and the processed pixel data are stored at regular intervals without division of the region of the memory. For example the initial pixel data and processed pixel data may be stored in the same rows (e.g. word lines, pages) whereas in other embodiments the initial pixel data and processed pixel data may be stored in different rows as illustrated in FIGS. 7A and 7B. When stored in the same row the initial pixel data and processed pixel data may be identified by different sets of column addresses but share the same row address.

For a frame image, processed pixel data corresponding to 8 bits of each of a plurality of pixels may be first stored. For example, 8-bit pixel data of a first pixel p_0 may be stored at a position of an address 0 (add_0), and then 8-bit pixel data of a second pixel p_1 may be stored at a position of an address 1 (add_1). According to this mode, 8-bit pixel data of each of the plurality of pixels may be stored in units of 8 bits. Thereafter, pixel data corresponding to 2 bits of each of the plurality of pixels may be sequentially stored. 2-bit pixel data of each of four pixels may be defined as one group and stored corresponding to one address. For example, 2-bit pixel data of first to fourth pixels p_0 to p_3 may be stored at a position of an address 80 (add_80), and then 2-bit pixel data of fifth to eighth pixels p_4 to p_7 may be stored at a position of an address 81 (add_81). After the pieces of 2-bit pixel data are stored as described above, 8-bit pixel data may be sequentially stored in the memory again.

According to an embodiment illustrated in FIG. 8A, when pieces of data are processed in units of 10-bit pixel data, 10-bit pixel images may be simultaneously read from one row. When pieces of data need to be accessed in units of 10-bit pixel data, 10-bit pixel data may be accessed by sensing and latching data from a row of memory, accessing from the sensed and latched row data 8-bit pixel data of a relevant pixel with a first column address and accessing from the sensed and latched row data 2-bit pixel data of the relevant pixel (along with other 2-bit pixel data of other pixels) with a second column address. Thus, 10-bit pixel data of a single pixel (in some examples, 8-bit processed pixel data and 2-bit initial pixel data) may be accessed without requiring access of different rows. When pieces of data need to be accessed in units of 8-bit pixel data, pixel data may be accessed in units of 8 bits by designating an address corresponding to 8-bit pixel data of a relevant pixel.

As illustrated in FIG. 8B, 8-bit pixel data may be stored in one-side (e.g., left) region of one line (or one row) of the memory, and 2-bit pixel data may be stored in another-side (e.g., right) region thereof. 8-bit pixel data and 2-bit pixel data may be accessed by the same row address. For example, the image processor may access the 8-bit pixel data by providing a first column address corresponding to a position at which the pieces of 8-bit pixel data have been stored and may access the 2-bit pixel data by providing a second column address corresponding to a position at which the pieces of 2-bit pixel data have been stored.

Although FIGS. 8A and 8B illustrate an example in which pieces of 10-bit pixel data are stored in the same region of the memory, embodiments of the inventive concept are not limited thereto. For example, since pieces of 10-bit pixel data are divided into 8-bit pixel data and 2-bit pixel data and the 8-bit pixel data and the 2-bit pixel data are stored in the memory at regular intervals, the 8-bit pixel data and the 2-bit pixel data may be considered as being stored in different regions of the memory.

Data may not be simultaneously stored/read in/from different regions of the memory in the example of FIGS. 7A and 7B, whereas data may be simultaneously stored/read in/from different regions of the memory in the example of FIGS. 8A and 8B. For example, in an embodiment illustrated by FIGS. 7A and 7B, a first 64-bit data transfer between the external memory to the codec on a data bus may accomplish the write or read operation of 8 pieces of 8-bit pixel data (e.g. for pixels p_0 through p_7), and a second 64-bit data access may accomplish the write or read operation of 32 pieces of 2-bit pixel data (e.g. for pixels p_0 through p_1f). The 8-bit pixel data and 2-bit pixel data of the first and second 64-bit data accesses may be stored in different rows (e.g. word lines, pages). In an embodiment illustrated by FIGS. 8A and 8B, a single 64-bit data access may transfer 6 pieces of 8-bit pixel data (e.g. for pixels p_0 through p_5) and 8 pieces of 2-bit pixel data (e.g. for pixels p_0 through p_7). The 8-bit pixel data and 2-bit pixel data of the single 64-bit data access may be simultaneously stored in and read from the same row, being differentiated by different column addresses.

Figure 9A:
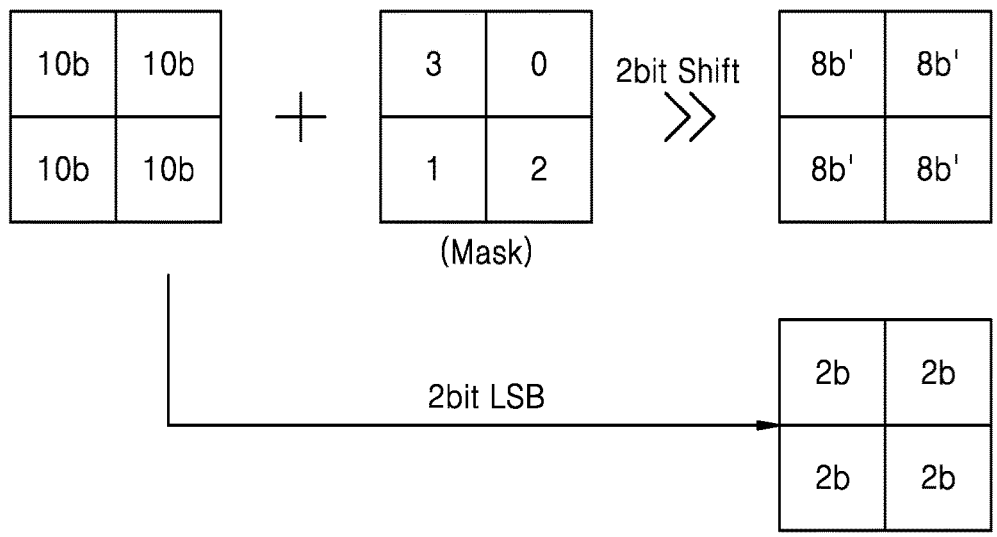
FIGS. 9A and 9B illustrate an example of dithering and inverse-dithering operations described with reference to FIG. 6.
Figure 9B:
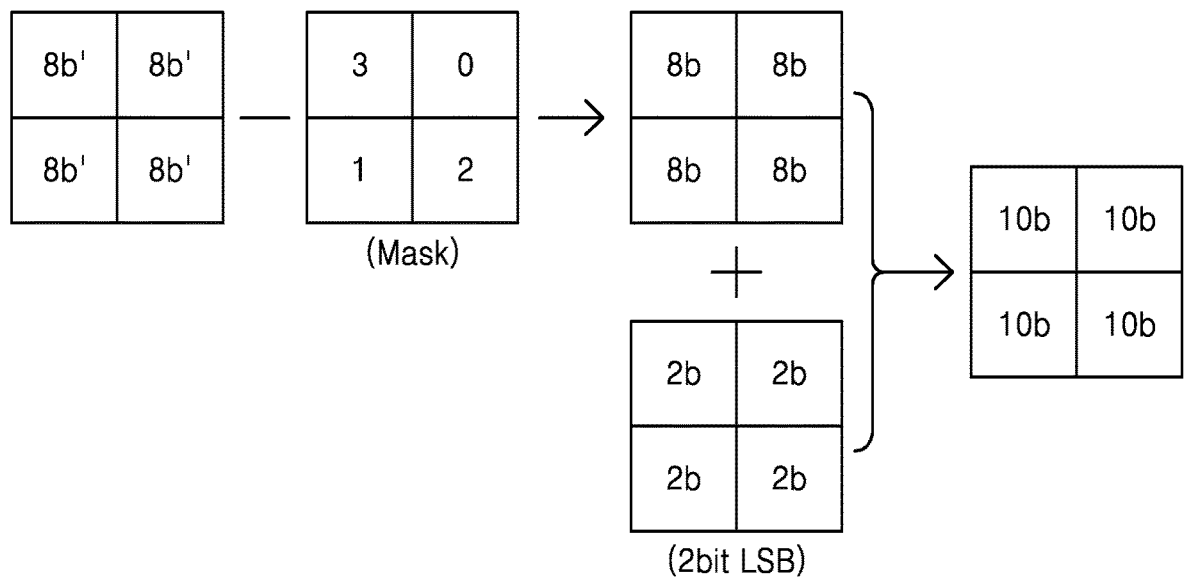

FIGS. 9A and 9B illustrate an example of the dithering and inverse-dithering operations described with reference to FIG. 6.

As in the above embodiment, an image signal having 10-bit pixel data per pixel is processed. When the display device implements a color depth/gray scale by 8-bit pixel data per pixel, image quality may be degraded. Accordingly, the codec module may perform dithering on the 10-bit pixel data (e.g., initial pixel data "10b"—four shown) of an image signal, and the dithered 8-bit pixel data (e.g., processed pixel data "8b'"—four shown) may be provided to the display device.

8-bit processed pixel data may be generated by performing dithering on the initial pixel data included in each pixel. As illustrated in FIG. 9A, each of the pixels of the original image signal may include 10-bit (10b) initial pixel data, and dithered processed pixel data may be generated by performing a predetermined operation (e.g., addition operation) on the 10-bit initial pixel data by using a mask of a predetermined format. 10-bit processed pixel data may be generated by performing an operation between the 10-bit initial pixel data and coefficients of a mask, and remaining 8-bit processed pixel data 8b' may be generated by removing lower 2 bits of (e.g., by 2-bit shifting) the 10-bit processed pixel data.

According to the above embodiment, 10-bit pixel data of each pixel may be stored separately in different regions of the memory. For example, the 8-bit processed pixel data 8b' may be stored in the first region of the memory, and lower 2-bit initial pixel data "2b" among the 10-bit initial pixel data may be stored in the second region of the memory.

Also, to perform an inverse-dithering operation, 8-bit initial pixel data 8b may be restored by performing a predetermined operation (e.g., subtraction operation) on the 8-bit processed pixel data 8b' read from the memory by using a predetermined mask, as illustrated in FIG. 9B. 10-bit pixel data 10b of a reference image may be generated by using the restored 8-bit initial pixel data 8b and the lower 2-bit initial pixel data 2b stored in the second region of the memory.

Although a mask of a 2×2 format is illustrated in the example of FIGS. 9A and 9B, embodiments of the inventive concept are not limited thereto. For example, when the unit of initial pixel data has a greater number of bits than 10 bits and 8-bit processed pixel data are to be generated by performing a dithering operation thereon, a mask of a format having a larger size than the mask of the 2×2 format may be used for the dithering operation.

Figure 10:
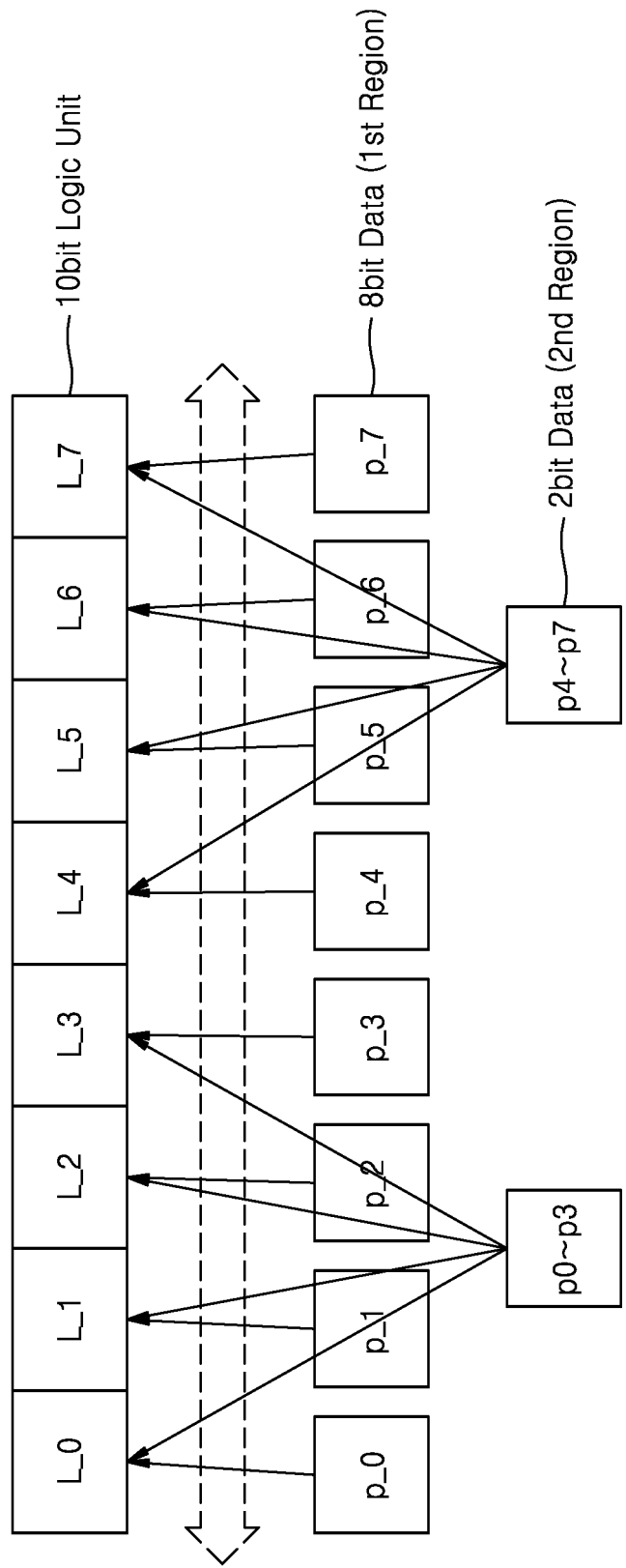
FIG. 10 is a block diagram of an example of transmitting data between the memory and logic units that perform signal processing on pixel data.

FIG. 10 is a block diagram of an example of transmitting data between the memory and logic units (e.g. functional blocks) that perform signal processing on pixel data. An image processor processing pixel data may include a plurality of logic units for signal processing on a plurality of pixels. FIG. 10 illustrates an example in which each logic unit processes 10-bit pixel data and pieces of pixel data are stored in the memory in units of 8 bits.

A logic unit may perform signal processing on data of each pixel. Accordingly, when the logic unit processes 10-bit pixel data, 8-bit pixel data and 2-bit pixel data stored in different regions of the memory need to be provided to the logic unit. The logic unit may construct one pixel according to the received pixel data and perform signal processing on the constructed pixel according to a relevant function.

According to the example of FIG. 10, first to eighth logic units L_0 to L_7 may respectively process first to eighth pixels p_0 to p_7. As an example, the first pixel p_0 may include 10-bit pixel data, where 8-bit pixel data among the 10-bit pixel data may be stored in the first region and 2-bit pixel data may be stored in the second region. The first logic unit L_0 may receive 8-bit pixel data of the first pixel p_0 stored in the first region and 2-bit pixel data of the first pixel p_0 stored in the second region and combine the 8-bit pixel data and the 2-bit pixel data to construct the first pixel p_0. When pieces of data of the first to eighth pixels p_0 to p_7 are simultaneously provided to the first to eighth logic units L_0 to L_7, 8-bit pixel data of the first to eighth pixels p_0 to p_7 stored in the first region of the memory may be provided to the logic units corresponding to the first to eighth pixels p_0 to p_7. Also, 2-bit pixel data of the first to eighth pixels p_0 to p_7 stored in the second region of the memory may be accessed in units of one group including data of four pixels, and 2-bit pixel data of the first to fourth pixels p_0 to p_3 corresponding to one address may be provided to the first to fourth logic units L_0 to L_3, respectively.

According to the above embodiment, a logic structure for an 8-bit processing operation and a 10-bit processing operation may be simplified. For example, when the data process unit of the logic unit is different from the data storage unit of the memory, an addressing process for providing 10-bit data of each pixel stored in the memory to the logic units corresponding to the first to eighth pixels p_0 to p_7 may be complicated. According to an embodiment of the inventive concept, a 10-bit logic unit may be constructed by an 8-bit register and a 2-bit register, and 8-bit pixel data stored in the first region of the memory may be provided to each of 8-bit registers along a data transfer path illustrated in FIG. 10. Also, in order to operate an additional 2-bit register according to a 10-bit processing operation, 2-bit pixel data stored in the second region of the memory may be provided to the 2-bit register, as illustrated in FIG. 10. In the 8-bit processing operation or the 10-bit processing operation, 8-bit pixel data of the first region may be provided to the 8-bit register through the same path, and 2-bit pixel data may be provided to the additional 2-bit register in the 10-bit processing operation. In this case, since the position of the address and the position of the pixel are aligned in the memory, addressing may be simplified. Also, since separate power to the additional 2-bit logic may be blocked by clock gating or power gating, power efficiency may be increased.

Figure 11:
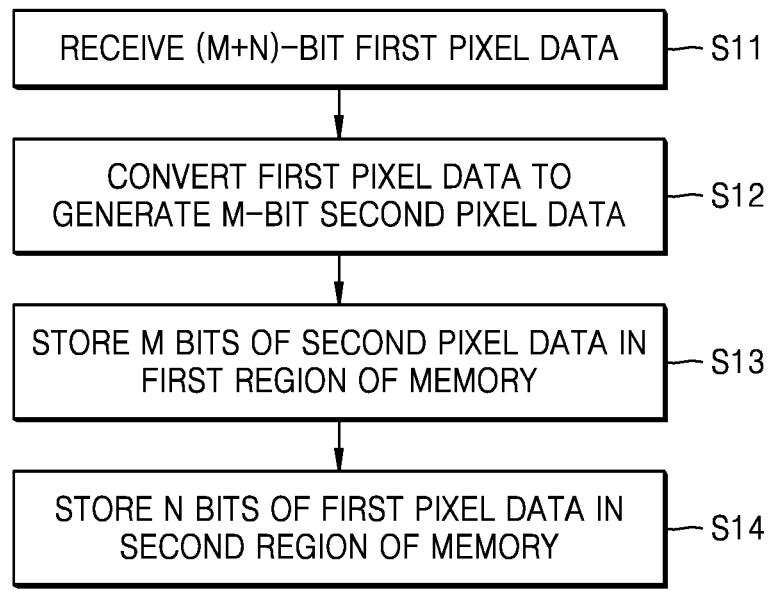
FIG. 11 is a flowchart of a method of operating an image processing system, according to an embodiment of the inventive concept.

FIG. 11 is a flowchart of a method of operating an image processing system, according to an embodiment of the inventive concept. FIG. 11 illustrates an example in which an image signal includes a plurality of pixels and each pixel includes (M+N)-bit pixel data. Also, an example of the codec module generating converted pixel data by performing a dithering operation is described as an image processor.

The image processing system receives (M+N)-bit pixel data (S11), and the pixel data may be referred to as (M+N)-bit initial pixel data corresponding to a signal before signal processing by the image processing system. The image processing system performs image processing on the (M+N)-bit initial pixel data and may generate, for example, M-bit processed pixel data by data conversion (S12).

The image processing system may access the memory to store/read pixel data in/from the memory. As an example, the image processing system may be provided inside an SoC and may access an embedded memory of the SoC. Also, the image processing system may access an external memory external to the SoC. According to the embodiment of FIG. 11, the image processing system may store pixel data in the embedded memory through a data bus located inside the SoC. Also, the image processing system may store pixel data in the external memory by providing the pixel data to the memory control module through a data bus located inside the SoC.

When the image processing system accesses the memory, pixel data may be divided and stored in units of M bits and N bits according to the above embodiment. For example, M-bit processed pixel data generated by the signal processing operation may be stored in the first region of the memory (S13). Also, N-bit initial pixel data of an original image signal may be stored in the second region of the memory (S14). Thereafter, in the case of other data processors using pixel data stored in the memory, a function based on an M-bit processing operation may be performed, or a function based on an (M+N)-bit processing operation may be performed. A system based on an M-bit processing operation may receive pixel data by accessing the first region of the memory, and a system based on an (M+N)-bit processing operation may receive pixel data by accessing the first region and the second region of the memory.

Figure 12:
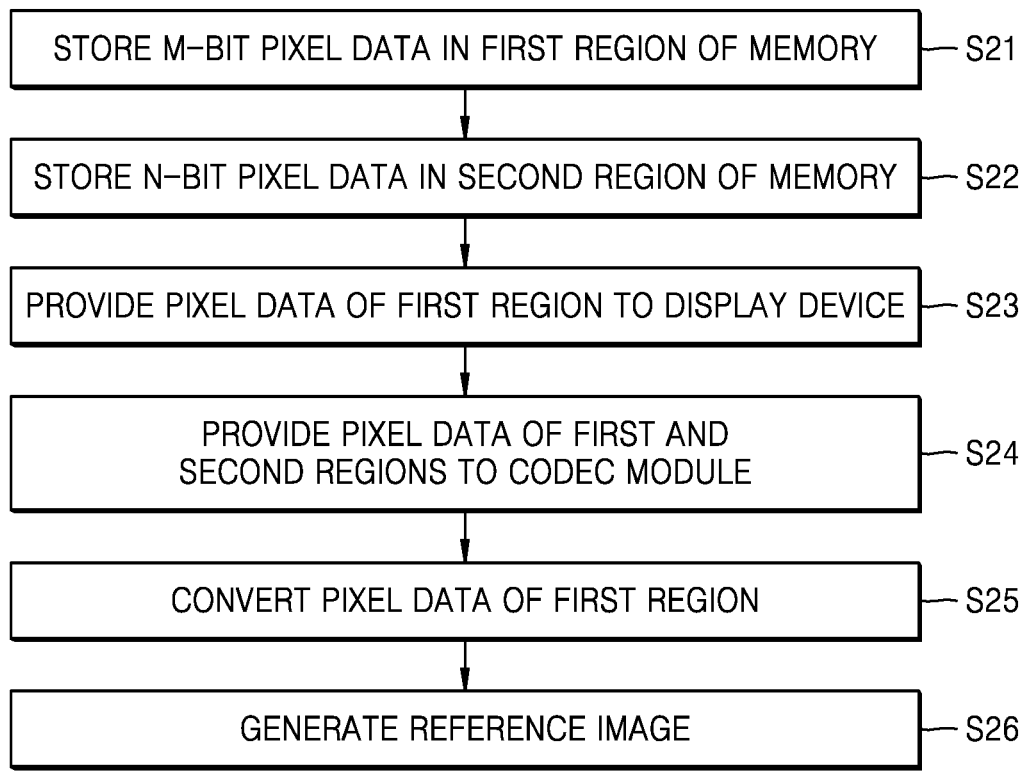
FIG. 12 is a flowchart of a method of operating an image processing system, according to another embodiment of the inventive concept.

FIG. 12 is a flowchart of a method of operating an image processing system, according to another embodiment of the inventive concept. FIG. 12 illustrates an example in which an image signal includes a plurality of pixels and each pixel includes (M+N)-bit pixel data. Also, FIG. 12 illustrates an example of an (M+N)-bit codec module and an M-bit display device, as an example in which pieces of pixel data stored in the memory are provided to image processors that process data in units of different number of bits.

First, according to the above embodiment, pieces of M-bit pixel data corresponding to a pixel are stored in the first region of the memory (S21) and pieces of N-bit pixel data corresponding to the pixel are stored in the second region of the memory (S22). Thereafter, the pixel data stored in the memory may be provided to various image processors.

For example, when the display device implements a color depth/gray scale of M bits according to M-bit pixel data of each pixel, the pixel data stored in the first region of the memory may be provided to the display device through a data bus having a bus width of M bits (or a multiple of M bits) (S23). The display device may display an image on a screen of the display by using the received pixel data. For example, the display device may display a screen with a color depth/gray scale of M bits according to M-bit pixel data per pixel.

Also, for an image processing operation, a frame image stored in the memory may be used as a reference image. To this end, (M+N)-bit pixel data stored in the first and second regions of the memory may be provided to the codec module (S24). According to the above embodiment, the pixel data stored in the first region of the memory may be provided to the codec module in units of M bits or in units of a multiple of M bits, and the pixel data stored in the second region of the memory may be provided to the codec module in units of a group. For example, one group may include N-bit pixel data of each of four pixels, and the number of bits of the pixel data of one group may correspond to M bits. Simultaneous transfer of the (M+N) bit pixel data for multiple pixels from the memory to the codec may be performed on a data bus having a width equal to an integer multiple of M (e.g., a 64 bit data bus when M=8).

The codec module may generate a reference image by using the received (M+N)-bit pixel data. For example, the codec module may convert the M-bit pixel data read from the first region of the memory (S25) and may generate a reference image by combining the converted pixel data and the N-bit pixel data read from the second region of the memory (S26). The reference image generated may be generated by a reference image generator implemented by a processor or codec module. The generated plurality of pixel values comprising the reference image may be substantially the same as corresponding pixels of the image stored as part of steps S21 and S22 but before any signal processing on the image (e.g. before a dithering and/or decoding step).

Figure 13A:
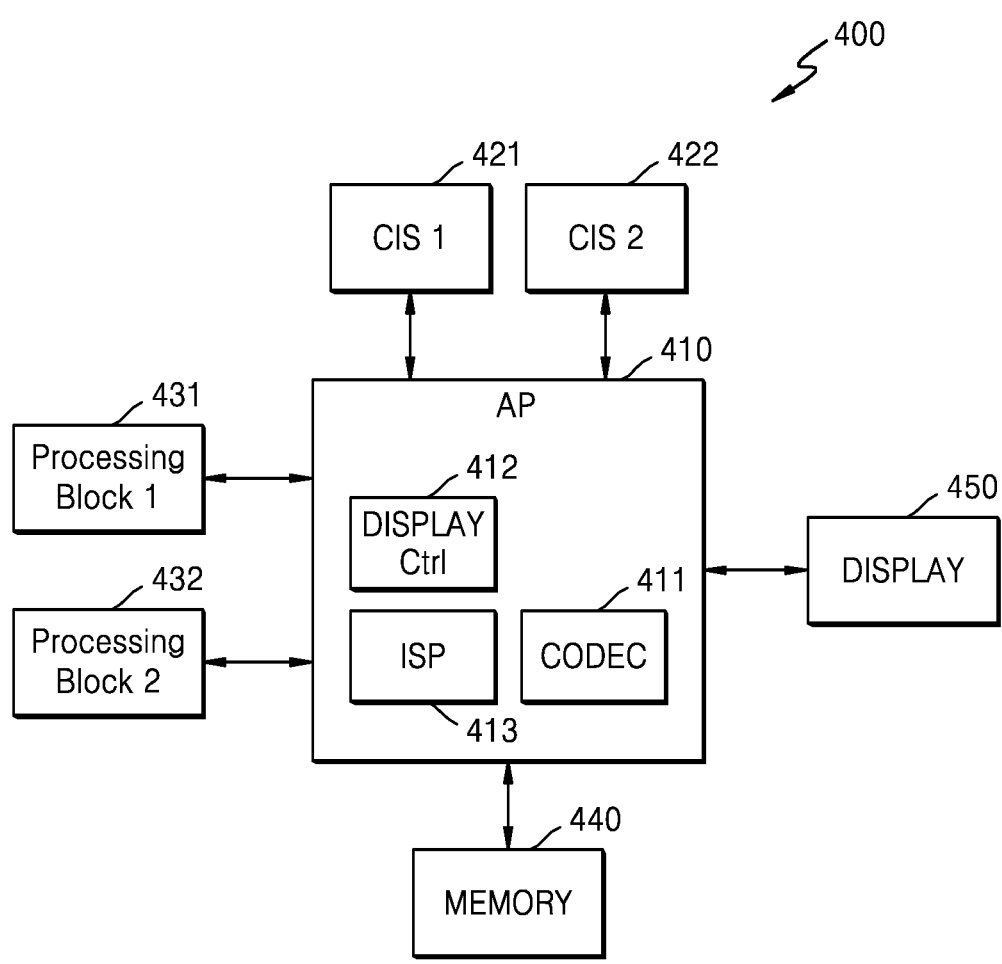
FIGS. 13A and 13B are block diagrams of another example of a system including an image processor according to an embodiment of the inventive concept.
Figure 13B:
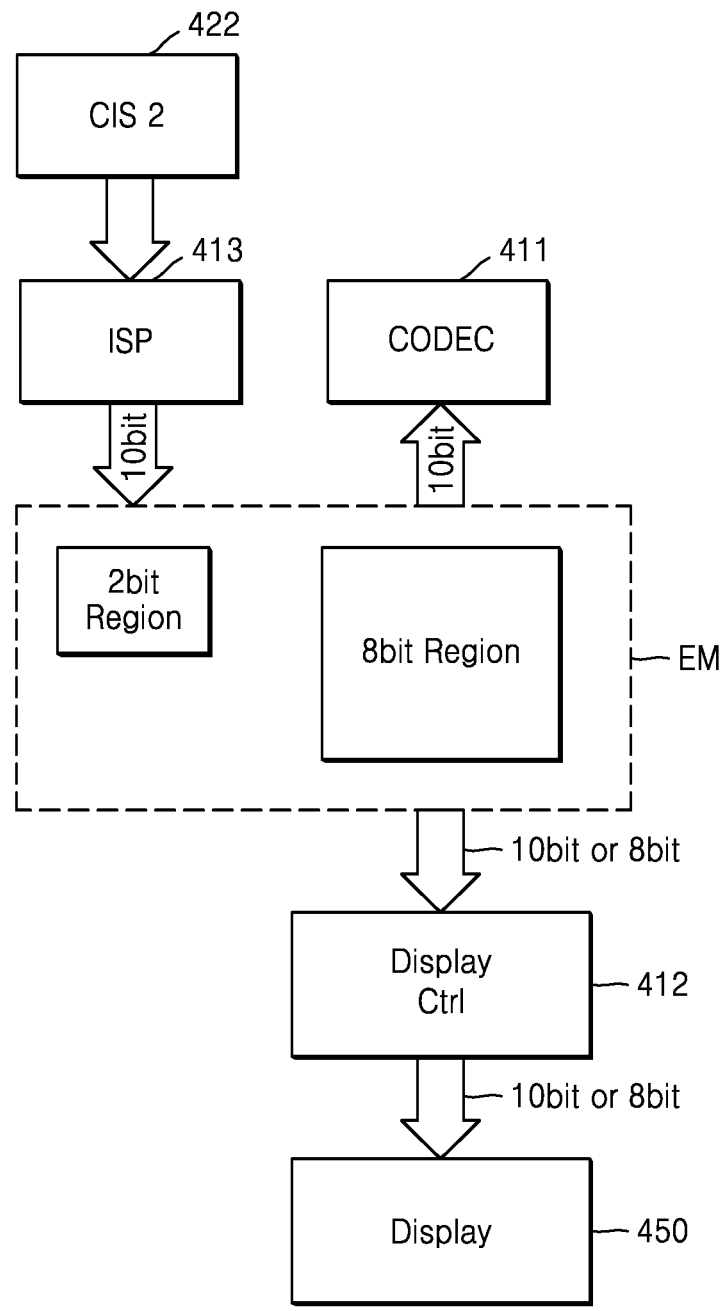

FIGS. 13A and 13B are block diagrams of another example of a system including an image processor according to an embodiment of the inventive concept. As an example, the system of FIG. 13A may be a mobile apparatus 400, and an image processor processing pixel data of an image signal is illustrated as a functional block inside the mobile apparatus 400. The image processor may be referred to as a processing block.

As illustrated in FIG. 13A, the mobile apparatus 400 may include an application processor 410, a first CIS 421, a second CIS 422, a first processing block 431, a second processing block 432, a memory 440, and a display device 450. Also, the application processor 410 may include a codec module 411, a display control module 412, and an image signal processor 413. The application processor 410 may include respective dedicated interfaces connected to respective external communication busses to communicate with each of the first CIS 421, a second CIS 422, a first processing block 431, a second processing block 432, a memory 440, and a display device 450 (e.g., corresponding to the arrows). Alternatively, such interfaces may not be dedicated and may be shared with other devices external to the application processor 410, such as those shown in FIG. 13A or other devices not shown in FIG. 13A. Interfaces may include electrical terminals (e.g, chip pads of a semiconductor chip) and input/output buffers of the application processor 510 having drivers and/or latches connected to a respective electrical terminal to respectively drive signals (data, address and command signals) output from the application processor 510 and latch signals (data, address and command signals) input from sources external to the application processor 510. Various functional blocks included in the mobile apparatus 400 may communicate with the application processor 410, and components in the application processor 410 may exchange signals with each other through a system bus. A mode register (not shown) of the application processor may be programmed and set (or the application processor may otherwise be programmed) to inform the application processor 410 of the number of bits to exchange with CIS 421, CIS 422, processing block 1 431, processing block 2 432, and display 450—thus M and N may be variable and adjusted depending upon the system in which the application processor 410 is employed.

The application processor 410 may be implemented as an SoC including a plurality of IP cores. Also, the functional blocks illustrated in FIG. 13A may transmit/receive pixel data having a different number of bits. For example, the second CIS 422 may generate pixel data of (M+N) bits per pixel, and the second processing block 432 may perform a processing operation by (M+N) bits per pixel, and the application processor 410 may exchange (transmit/receive) pixel data of (M+N) bits per pixel with the second CIS 422 and the second processing block 432. For example, M may equal 8 and N may equal 2, 4 or 8.

Also, the first CIS 421 may generate pixel data of M bits per pixel, and the first processing block 431 and the display device 450 may perform a processing operation by M bits per pixel. The application processor 410 may exchange data of M bits per pixel with the first CIS 421, the first processing block 431, and the display device 450. The application processor 410 may control an access to the first region and the second region of the memory 440 according to the data processing feature of each of the functional blocks.

As an example, the first CIS 421 and the second CIS 422 may generate image signals having different color depth/gray scale, and the image signal processor 413 may generate pixel data having a different number of bits per pixel. For example, the image signal processor 413 may generate pixel data of M bits per pixel with respect to the image signal received from the first CIS 421. Also, the image signal processor 413 may generate pixel data of (M+N) bits per pixel with respect to the image signal received from the second CIS 422. As in the above embodiment, the (M+N)-bit pixel data may be divided into M-bit pixel data and N-bit pixel data, and each of the divided pixel data may be provided to the memory 440 through the M-bit (multiple-M-bit) data bus.

The (M+N)-bit pixel data may be divided into M-bit pixel data and N-bit pixel data, and the M-bit pixel data and the N-bit pixel data may be stored in different regions of the memory 440. For example, M-bit pixel data may be provided to the memory 440 through the M-bit (or multiple-M-bit) data bus, N-bit pixel data of a plurality of pixels may be defined as a group, and the pixel data of the group may be provided to the memory 440 through the M-bit (or multiple-M-bit) data bus. After pieces of M-bit pixel data (e.g., upper M-bit pixel data) of each pixel are provided to the memory 440, N-bit pixel data (e.g., lower N-bit pixel data) of each pixel may be sequentially provided to the memory 440.

The first processing block 431 and the second processing block 432 may access the memory 440 according to data process units defined respectively for the first processing block 431 and the second processing block 432. Also, the display device 450 may receive M-bit pixel data and display the M-bit pixel data to a screen by implementing a color depth/gray scale according to the received M-bit pixel data.

FIG. 13B illustrates an example in which the system of FIG. 13A accesses a memory. The memory illustrated in FIG. 13B may be the memory 440 of FIG. 13A or the embedded memory provided inside the SoC (e.g., the application processor 410 of FIG. 13A).

The second CIS 422 may include a sensing unit (not illustrated) that, for each pixel sensor of the sensing unit, generates an electrical signal having a magnitude (e.g. corresponding to the intensity of light) received by the pixel sensor and converts the same to a corresponding digital value to provide an image signal to the image signal processor (ISP) 422 which provides a processed image to the application processor 510. The image may be a still image comprising a plurality of pixel values for each of the pixels and/or a video image comprising a plurality of still images (frames). In some embodiments, a separate ISP 422 may not be used and any desired image processing to obtain an initial image may be performed by the application processor 510. The second CIS 422 may generate 10-bit pixel data and provide the 10-bit pixel data to the memory so that the pieces of 10-bit pixel data are divided into 8-bit pixel data and 2-bit pixel data and the 8-bit pixel data and the 2-bit pixel data are stored separately in the memory EM. The application processor 510 may receive a sensed image from the first or second CIS 421 or 422 from separate respective interfaces of the application processor 510 or a shared interface of the application processor 510.

8-bit pixel data of each of the pixels may be stored in the first region (8-bit region) of the memory EM, and 2-bit pixel data of each of the pixels may be stored in the second region (2-bit region) of the memory EM. The pixel data stored in the memory may be used by other image processors.

For example, the 8-bit pixel data stored in the first region (8-bit region) of the memory EM may be provided to the display device to display an image. The display control module 412 may access each of a first region (8-bit region) and a second region (2-bit region) of the memory EM. When the display device 450 implements a color depth/gray scale of 8 bits per pixel, the display control module 412 may selectively access the first region (8-bit region) of the memory EM to provide pixel data to the display device 450.

The codec module 411 may perform an encoding operation on the pixel data (e.g., decoded pixel data) stored in the memory EM. Thus, the codec module 411 may include an encoding unit (not illustrated). The encoding operation may be performed on a data unit of 10 bits per pixel. Thus, the pixel data stored in the first region (8-bit region) and the second region (2-bit region) of the memory may be provided to the encoding unit. The encoding unit may generate a bit stream through an encoding operation, and the generated bit stream may be stored in the system or may be transmitted to other systems.

Figure 14:
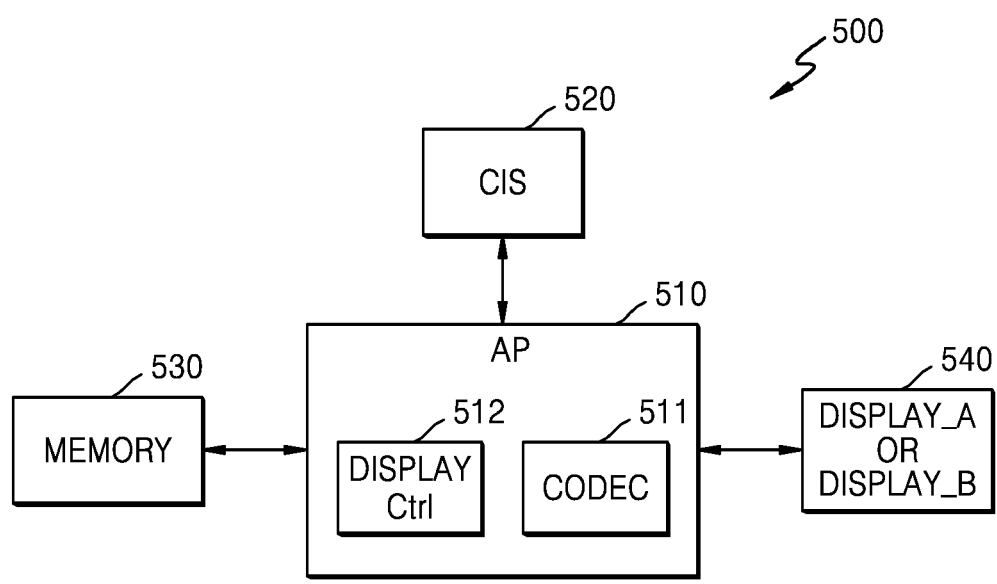
FIG. 14 is a block diagram of another example of a system including an image processor according to an embodiment of the inventive concept.

FIG. 14 is a block diagram of another example of a system including an image processor according to an embodiment of the inventive concept. As an example, the system of FIG. 14 includes a display device that implements a color depth/gray scale by at least two different numbers of pixel data (e.g. by Display_A or Display_B). A mode register (not shown) of the application processor may be set (or the application processor may otherwise be programmed) to inform the application processor 510 of the color depth/gray scale of the display and thus the number of bits to transmit to the display 540. Thus, the color depth/gray scale may be variable and adjusted depending upon the display to which the application processor 510 is connected. In addition, M may be set to the color depth/gray scale (the number of bits of the color depth/gray scale) of the display and thus M and N may be programmable and variable.

Each functional block illustrated in FIG. 14 may correspond to an image processor according to an embodiment of the inventive concept. Also, one or more functional blocks illustrated in FIG. 14 may constitute an image processing system according to an embodiment of the inventive concept. Also, an SoC according to an embodiment of the inventive concept may include one or more image processors that perform image processing according to an embodiment of the inventive concept. For example, the application processor of FIGS. 13A and 14A and the application processor 510 of FIG. 14 may be an SoC according to an embodiment of the inventive concept (e.g. SoC 100 of FIG. 3). Also, the systems of FIGS. 13A, 13B and 14 may be implemented in a mobile apparatus 500, such as a smart phone.

As illustrated in FIG. 14, the mobile apparatus 500 may include an application processor 510, a CIS 520, a memory 530, and a display device 540 A. Also, the application processor 510 may include a codec module 511 and a display control module 512. Also, the display device 540 may be a Display_A that implements a color depth/gray scale of each pixel by (M+N)-bit pixel data. Also, the display device 540 may be a display device Display_B that implements a color depth/gray scale of each pixel by M-bit pixel data. A data bus for transmission/reception of pixel data in the application processor 510 has a bus width of M bits (or an integer multiple of M bits).

According to the embodiment illustrated in FIG. 14, the application processor 510 may store the (M+N)-bit pixel data in the memory 530 without a separate process for reducing the number of bits of the (M+N)-bit pixel data. Since the display device Display_A implements a color depth/gray scale of each pixel by using (M+N)-bit pixel data, a dithering operation on the initial pixel data may not result in converting the number of bits as in the other embodiments. As in other embodiments, (M+N)-bit pixel data may be provided to the memory 530 through an M-bit (or an integer multiple of M-bit) data bus. As an example, after M-bit pixel data of each pixel is provided to the memory 530, N-bit pixel data of a plurality of pixels may be identified and accessed as a group and pixel data of the group may be provided to the memory 530. Also, the M-bit pixel data and the N-bit pixel data may be stored in different regions of the memory 530.

The CIS 520 may generate an image signal having (M+N)-bit pixel data per pixel or an image signal having M-bit pixel data per pixel. The application processor 510 may be programmed with a value to indicate the size of the pixel data to be generated by CIS 520 (e.g., with a mode register). When pieces of pixel data of M bits per pixel are generated, the pixel data may be stored in the first region of the memory 530. Also, when pixel data of (M+N) bits per pixel are generated, the pixel data may be stored separately in the first region and the second region of the memory 530. Also, under the control of the display control module 512, the display device Display_A may receive (M+N)-bit pixel data per pixel from the memory 530 and implement a color depth/gray scale of M+N bits.

FIG. 14 illustrates an example in which a display device Display_B implements a color depth/gray scale by using M-bit pixel data. In this case, according to the above embodiment, the codec module 511 may generate dithered M-bit pixel data by performing dithering as described elsewhere herein. The M-bit pixel data may be stored in the first region of the memory 530. Under the control of the display control module 512, the display device Display_B may receive only M-bit pixel data (e.g., dithered pixel data) from the memory 530.

In the case of communication between the application processor 510 and the display device 540, embodiments of the inventive concept may be applied selectively according to the configuration of the system. For example, when the display device Display_A implementing a color depth/gray scale by (M+N)-bit pixel data is used and the application processor 510 and the display device Display_A communicate through (M+N) data lines (or data bus), (M+N)-bit pixel data read from the first region and the second region of the memory 530 may be provided in parallel in a first mode of operation of the application processor. Alternatively, when the application processor 510 and the display device Display_A communicate through M data lines, M-bit data of the first region of the memory 530 may be provided and then N-bit data of the second region of the memory 530 may be provided in a second mode of operation of the application processor. The different modes of operation of the application processor may be selected by programming the application processor (e.g. via a mode register of the application processor).

Figure 15:
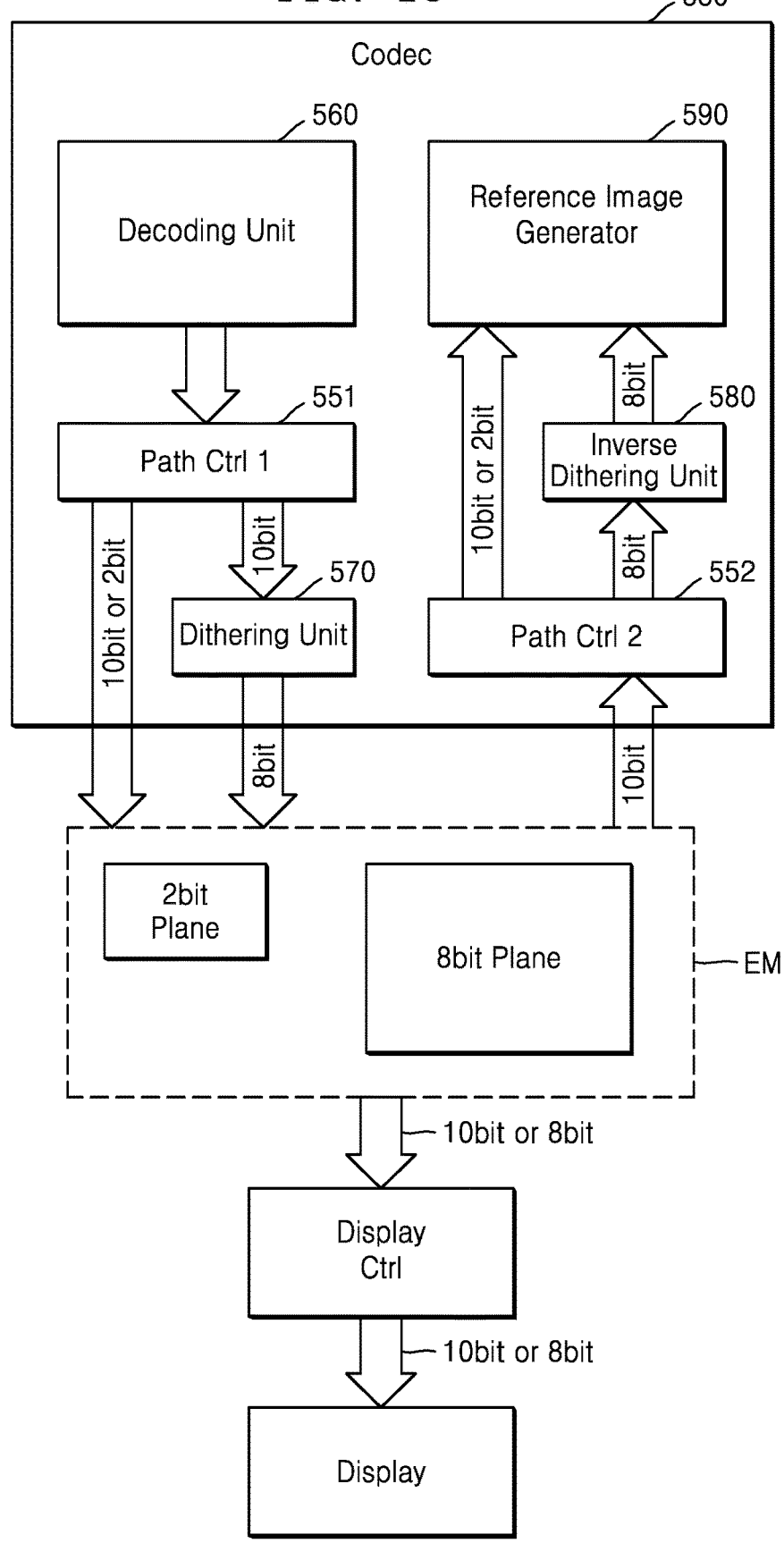
FIG. 15 is a block diagram of an example of a codec module as an image processor according to an embodiment of the inventive concept.

FIG. 15 is a block diagram of an example of a codec module 550 as an image processor according to an embodiment of the inventive concept. In FIG. 15, a memory, a display control module, and a display are further illustrated in addition to the codec module 550. Also, the memory of FIG. 15 may be an external memory EM disposed outside an SoC or an embedded memory of the SoC. Hereinafter, it is assumed that the memory of FIG. 15 is an external memory EM. Also, in FIG. 15, an example of (M+N)-bit pixel data is provided, corresponding to 10 bits, where M-bit pixel data corresponds to 8 bits, and N-bit pixel data corresponds to 2 bits.

The codec module 550 may include a data providing unit that provides pixel data to the external memory EM and a data receiving unit that receives pixel data from the external memory EM. The data providing unit may include a decoding unit 560 that decodes an encoded image signal and a dithering unit 570 that performs dithering on a decoded image signal (e.g., original image signal) generated by the decoding unit 560. Also, the data providing unit may further include a first path control unit 551 that controls a transfer path of pixel data.

The data receiving unit may include an inverse-dithering unit 580 that restores pixel data by performing inverse-dithering on the pixel data received from the external memory EM and a reference image generator 590 that generates a reference image corresponding to the original image signal by using the restored pixel data and the pixel data received from the external memory EM. Also, the data receiving unit may further include a second path control unit 552 that controls a transfer path of the pixel data received from the external memory EM.

As described in the embodiment of FIG. 14, various display devices may be provided in a system such as a mobile apparatus using an SoC according to an embodiment of the inventive concept. As an example, the codec module 550 may perform or skip a dithering operation according to the screen display feature (e.g., the number of bits per pixel for implementation of a color depth/gray scale) of the display device used in the system. When the display device used in the system implements a color depth/gray scale according to 10-bit pixel data per pixel, the first path control unit 551 may provide pixel data of an original image to the external memory EM. For example, the first path control unit 551 may perform control such that the more significant 8 bits of the 10-bit pixel data are stored in the first region of the external memory EM and the lesser significant 2 bits of the 10-bit pixel data are stored in the second region of the external memory EM.

The memory controller or codec module may divide the 10-bit pixel data into 8-bit segments and groupings of 2-bit segments and store each at predetermined addresses in the external memory EM in the process of transferring the 10-bit data on a data bus to the external memory EM. For example, a plurality of 8-bit segments of pixels may occupy the entire width of the data bus and groupings of 2-bit segments of pixels may follow in regular intervals in subsequent data transfers. In other example embodiments the data bus may have a data width (e.g. 16-bit, 32-bit, 64-bit, 128-bit, etc.) such that 8-bit segments and groupings of 2-bit segments are transferred in the same access. Corresponding column addresses may be used to identify memory locations of the 8-bit segments and groupings of the 2-bit segments. The display controller may repackage the 8-bit and 2-bit segments into the original 10-bit pixel data for color depth/gray scale implementations at the display.

When the display device used in the system implements a color depth/gray scale according to 8-bit pixel data per pixel, a dithering operation may be performed on 10-bit pixel data of each pixel of the original image and a screen may be displayed by 8-bit pixel data as a result of the dithering operation. To this end, the first path control unit 551 may provide pixel data of the original image to the dithering unit 570. In an embodiment, the first path control unit 551 may provide lower 2-bit pixel data of 10-bit pixel data to the external memory EM such that the lower 2-bit pixel data may be stored in the second region of the external memory EM. Also, the first path control unit 551 may provide 10-bit pixel data to the dithering unit 570, and dithered 8-bit pixel data from the dithering unit 570 may be stored in the first region of the external memory EM.

The pixel data stored in the external memory EM may be read and provided to the second path control unit 552. When the pieces of pixel data stored in the external memory EM correspond to the original image that is not dithered, the second path control unit 552 may provide the 10-bit pixel data stored in the external memory EM to the reference image generator 590. When the pieces of pixel data stored in the external memory EM correspond to dithered data, the second path control unit 552 may provide the 2-bit pixel data read from the second region of the external memory EM to the reference image generator 590, and the second path control unit 552 may provide the 8-bit pixel data read from the first region of the external memory EM to the inverse-dithering unit 580, and the 8-bit pixel data restored from the inverse-dithering unit 580 may be provided to the reference image generator 590.

Also, the display control module may perform an access to the first region and the second region of the external memory EM according to the characteristics of the display device. Depending on the characteristics of the display device (which may be stored in the codec), 8-bit pixel data may be provided to the display device, or 10-bit pixel data may be provided to the display device.

According to the embodiment of FIG. 15, an SoC using the codec module 550 according to an embodiment of the inventive concept may process data adaptively according to the feature of the display device that may be driven by the SoC. Also, since the pieces of pixel data are divided and managed according to the above embodiment, the data bus may be efficiently used. Also, since dithering is performed selectively according to the used display device, image quality degradation may be prevented.

Although data image processing, storage, accessing, and displaying in FIG. 15 is illustrated using 10-bit pixels, divided into 8-bit more significant bits and 2-bit less significant bits, an embodiment of the inventive concept illustrated therein is not so limited. The pixel depth is configurable depending on the display device or other functional block within the image processing system. For example, the 10-bit pixels may actually be any positive integer value greater than 1 and thus comprised of two positive, integer variables M and N, where M+N is the pixel depth in bits. The addition of M and N (i.e. M+N) may be, e.g., 10, 12, etc. and in such examples M may be 8 and N may be 2, 4, etc. In FIG. 15, the illustrated 8-bit values therefore may be replaced by the variable M, the 2-bit values may be replaced by N, and the 10-bit values replaced by M+N. This variable replacement may likewise be performed by embodiments illustrated by FIG. 6.

Figure 16:
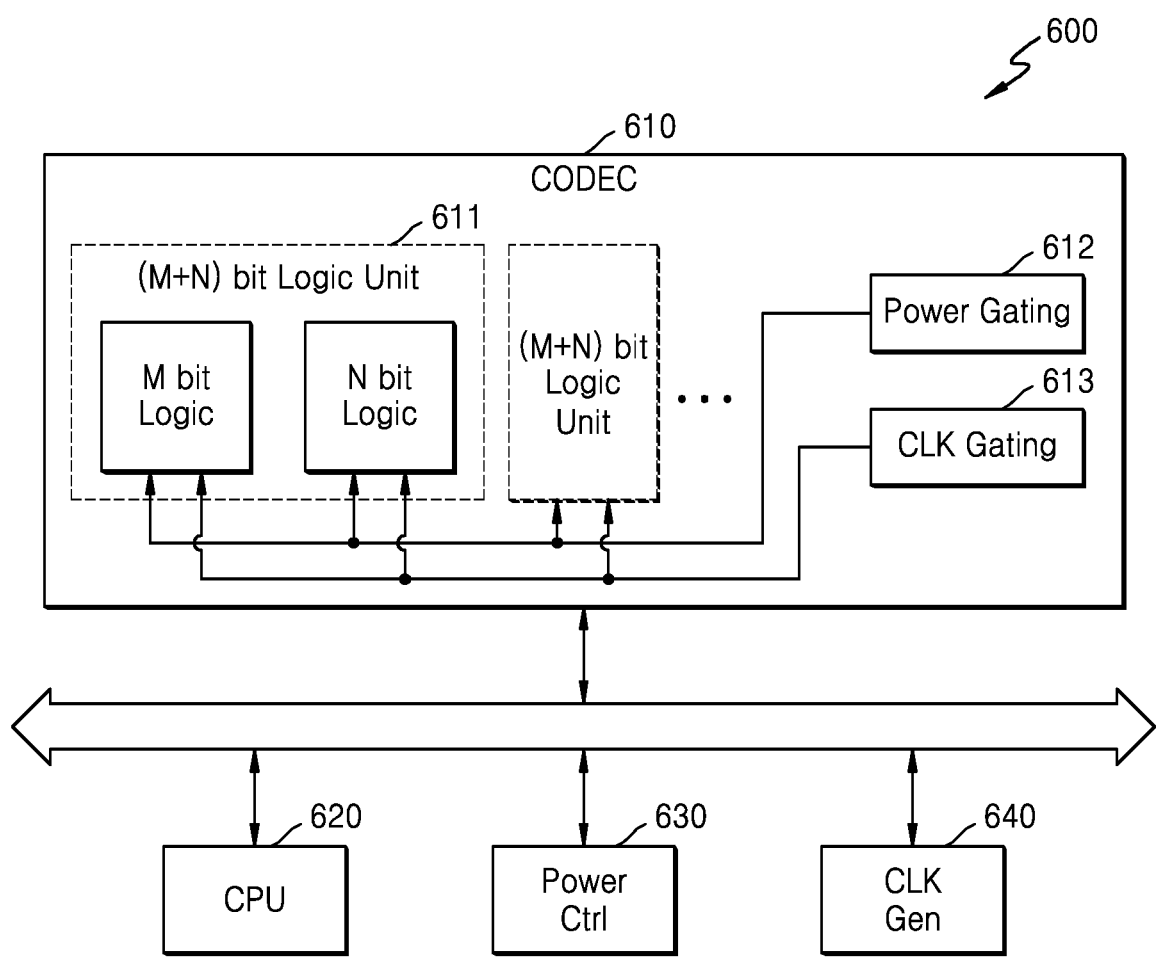
FIG. 16 is a block diagram of an image processing system according to another embodiment of the inventive concept.

FIG. 16 is a block diagram of an image processing system 600 according to another embodiment of the inventive concept. The image processing system 600 illustrated in FIG. 16 may be implemented in an SoC, and an example of a codec module among IP cores provided in the SoC is illustrated. Although not illustrated in FIG. 16, an embodiment of the inventive concept may also be applied to other functional blocks that are provided in the SoC to transmit/receive pixel data.

As illustrated in FIG. 16, the image processing system 600 may include a plurality of IP cores that communicate with each other through a system bus. For example, the image processing system 600 may include a codec module 610, a CPU 620, a power control module 630, and a clock generating module 640. Also, the codec module 610 may include one or more logic units 611 for processing pixel data. For example, each of the logic units 611 may be an (M+N)-bit logic unit that processes (M+N)-bit pixel data. Also, the logic unit 611 may include an M-bit logic that processes M-bit pixel data and an N-bit logic that processes N-bit pixel data. Also, the codec module 610 may further include a power gating unit 612 for gating power supplied to one or more logic units 611 and a clock gating unit 613 for gating a clock signal.

The M-bit logic and the N-bit logic included in the logic unit 611 of the codec module 610 may operate separately. For example, when an image signal provided to the codec module 610 or an image signal output from the codec module 610 includes M-bit pixel data per pixel, the N-bit logic of the codec module 610 does not need to be used. In this case, the power gating unit 612 may perform control such that power is supplied to the M-bit logic of each logic unit 611 and power is not supplied to the N-bit logic thereof. Also, the clock gating unit 613 may perform control such that a clock signal is provided to the M-bit logic of each logic unit 611 and a clock signal is not provided to the N-bit logic thereof.

When an image signal provided to the codec module 610 or an image signal output from the codec module 610 includes (M+N)-bit pixel data per pixel, power and a clock signal may be provided to both the M-bit and the N-bit logic according to the operations of the power gating unit 612 and the clock gating unit 613.

Figure 17:
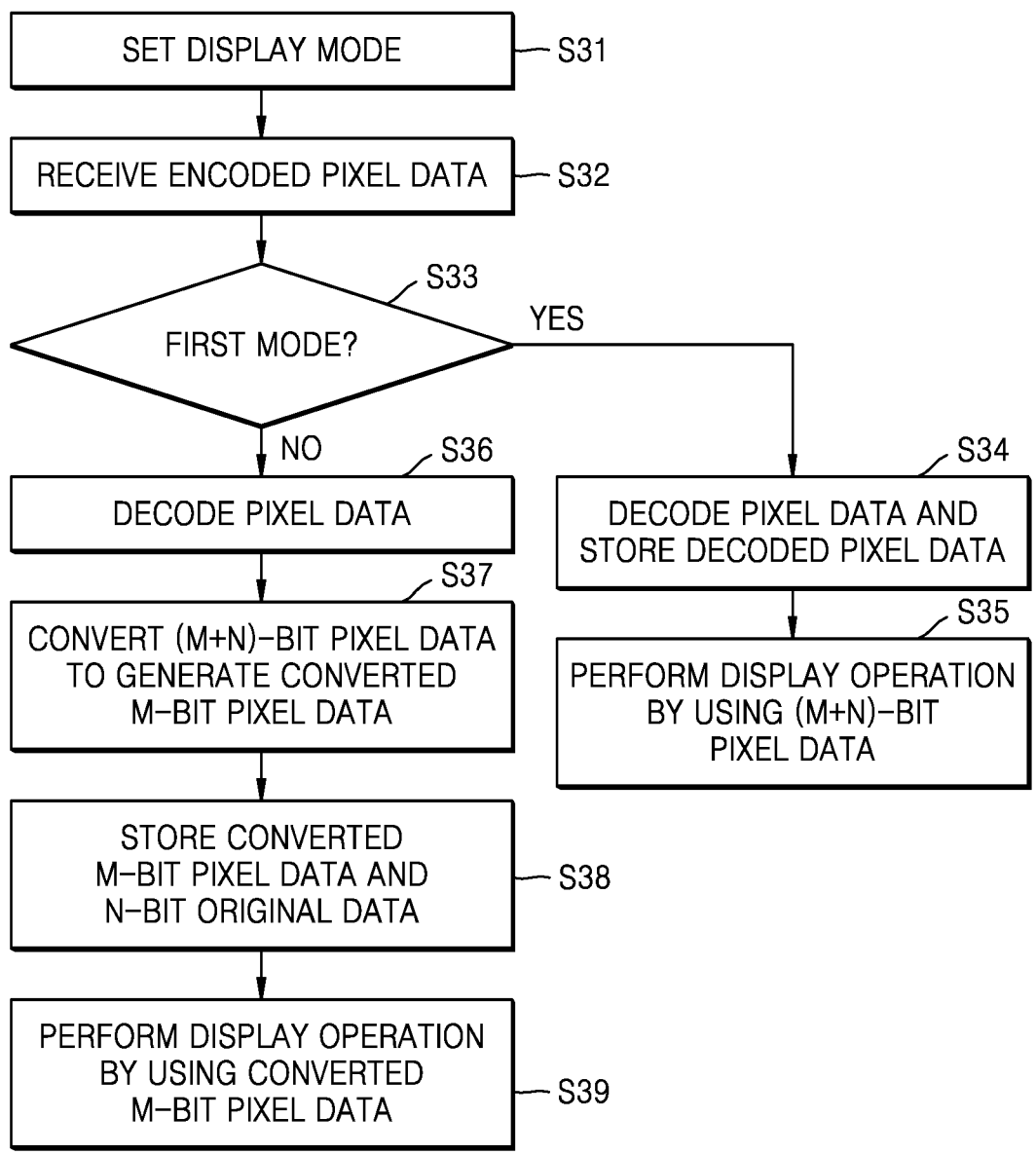
FIG. 17 is a flowchart of a method of operating an image processing system, according to another embodiment of the inventive concept.

FIG. 17 is a flowchart of a method of operating an image processing system, according to another embodiment of the inventive concept. FIG. 17 illustrates an example of image signal processing that is adaptive to a display device.

As illustrated in FIG. 17, a display mode may be set according to the feature of a display device that displays a screen according to pixel data provided by the image processing system (S31). For example, the display device may support a color depth/gray scale implemented according to data of a predetermined and fixed number of bits. The number of bits of pixel data for implementing a color depth/gray scale of one pixel may vary from one display device to another.

When the image processing system accesses the memory by (M+N)-bit pixel data per pixel, the image processing system receives pixel data of an encoded image signal (S32) and performs signal processing on the pixel data of the encoded image signal according to a predetermined mode. For example, when a display device implementing a color depth/gray scale of (M+N)-bits is used, the operation mode of the image processing system may be set to a first mode. When a display device implementing a color depth/gray scale by using M-bit pixel data is used, the operation mode of the image processing system may be set to a second mode. Whether the operation mode of the image processing system is set to the first mode is determined (S33) (e.g., in response to information received from the display device or in response to a programming operation). If the operation mode of the image processing system is set to the first mode, the received pieces of encoded pixel data are decoded and the decoded pieces of (M+N)-bit pixel data are stored in the memory (S34). The (M+N)-bit pixel data may be stored in the memory without a separate process for converting the bits of the decoded (M+N)-bit pixel data (e.g., without a separate dithering process), and as in the above embodiment, the (M+N)-bit pixel data may be divided into M-bit pixel data and N-bit pixel data and the M-bit pixel data and the N-bit pixel data may be stored in different regions of the memory. Thereafter, the (M+N)-bit pixel data stored in the memory are provided to the display device, and the display device performs a display operation by implementing a color depth/gray scale of (M+N)-bits for each pixel (S35).

If the operation mode of the image processing system is set to the second mode, the encoded pieces of pixel data are decoded (S36) and the decoded pieces of (M+N)-bit pixel data are converted (S37). As an example, converted pieces of M-bit pixel data are generated by dithering the (M+N)-bit pixel data. The converted M-bit pixel data and the N-bit pixel data (e.g., pixel data of an original image signal) may be stored in different regions of the memory (S38). Thereafter, the pieces of M-bit pixel data stored in the first region of the memory are selectively read and provided to the display device, and the display device performs a display operation by implementing a color depth/gray scale by using M-bit pixel data of each pixel (S39).

Figure 18:
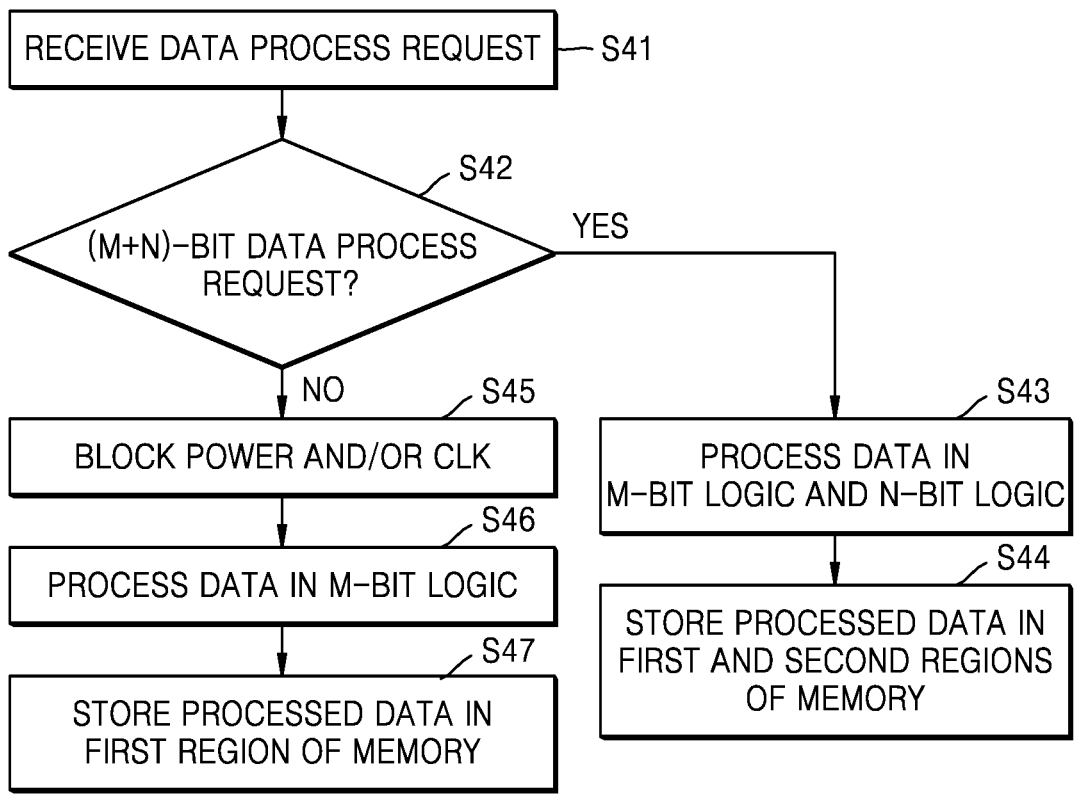
FIG. 18 is a flowchart of a method of operating an image processing system, according to another embodiment of the inventive concept.

FIG. 18 is a flowchart of a method of operating an image processing system, according to another embodiment of the inventive concept. FIG. 18 illustrates an example of gating power and at least one clock signal according to a process unit of an image signal.

The image processing system receives a data process request (S41). In response to the data process request, data may be processed by an image processor provided in the image processing system. For example, when the image processor performs a processing operation in units of (M+N)-bit data, the image processor may include one or more logic units for processing (M+N)-bit pixel data and each logic unit may include an M-bit logic and an N-bit logic.

The logic unit may process (M+N)-bit pixel data or M-bit pixel data according to a data processing operation. The image processing system determines whether the data process request is an (M+N)-bit data process request (S42). If the data process request is an (M+N)-bit data process request, the image processing system performs control to drive both the M-bit logic and the N-bit logic. Accordingly, the (M+N)-bit logic unit performs a processing operation on the (M+N)-bit pixel data (S43). The processed (M+N)-bit pixel data may be stored in the memory. For example, the M-bit pixel data may be stored in the first region of the memory, and the N-bit pixel data may be stored in the second region of the memory (S44).

If the data process request is an M-bit data process request, the image processing system may block the supply of power and/or the provision of at least one clock signal to the N-bit logic based on power gating and/or clock gating (S45). Accordingly, the M-bit logic may be selected to process M-bit pixel data (S46). The processed M-bit pixel data may be stored in the first region of the memory (S47).

Figure 19:
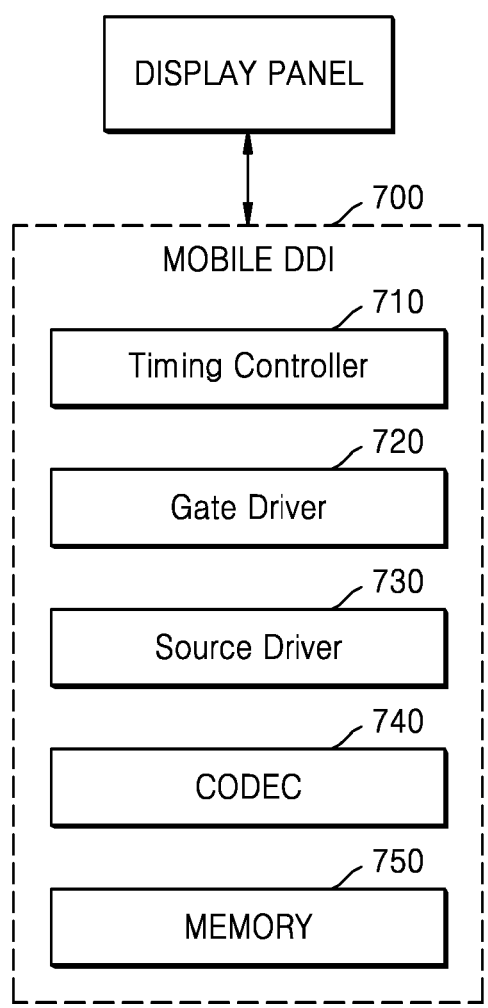
FIG. 19 is a block diagram of a display driving circuit employing an image processing system according to an embodiment of the inventive concept.

FIG. 19 is a block diagram of a display driving circuit 700 employing an image processing system according to an embodiment of the inventive concept. As an example, the display driving circuit may be a mobile display driving circuit (DDI) that is installed in a mobile apparatus.

The image processing system according to an embodiment of the inventive concept may be implemented variously. For example, the image processing system may be implemented as an SoC as described above. The display driving circuit 700 of FIG. 19 may include a timing controller 710, a gate driver 720, a source driver 730, a codec module 740, and a memory 750 as various functional blocks. Various functional blocks in the display driving circuit 700, including the codec module 740, may be defined as an SoC that is integrated on one semiconductor chip. Also, the memory 750 may be included in the SoC. In this case, the memory 750 may be referred to as an embedded memory. Also, the memory 750 may be disposed outside the SoC. In this case, the memory 750 may be referred to as an external memory.

The timing controller 710 may control the timing of various signals related to a display operation. The timing controller 710 may generate various control signals for timing control and provide the various control signals to other functional blocks. The gate driver 720 may drive a gate line of a display panel under the control of the timing controller 710, and the source driver 730 may drive a data line of the display panel under the control of the timing controller 710. Also, the codec module 740 may access the memory 750 as in the above embodiment. In an embodiment, the codec module 740 may receive and process an image signal including (M+N)-bit pixel data per pixel, store M-bit pixel data in the first region of the memory 750, and store N-bit pixel data in the second region of the memory 750. When the display panel implements a color depth/gray scale of M-bits for each pixel, the pixel data stored in the first region of the memory 750 may be accessed and provided to the display panel. When the display panel implements a color depth/gray scale of (M+N)-bits for each pixel, the pixel data stored in the first and second regions of the memory 750 may be accessed and provided to the display panel.

Figure 20:
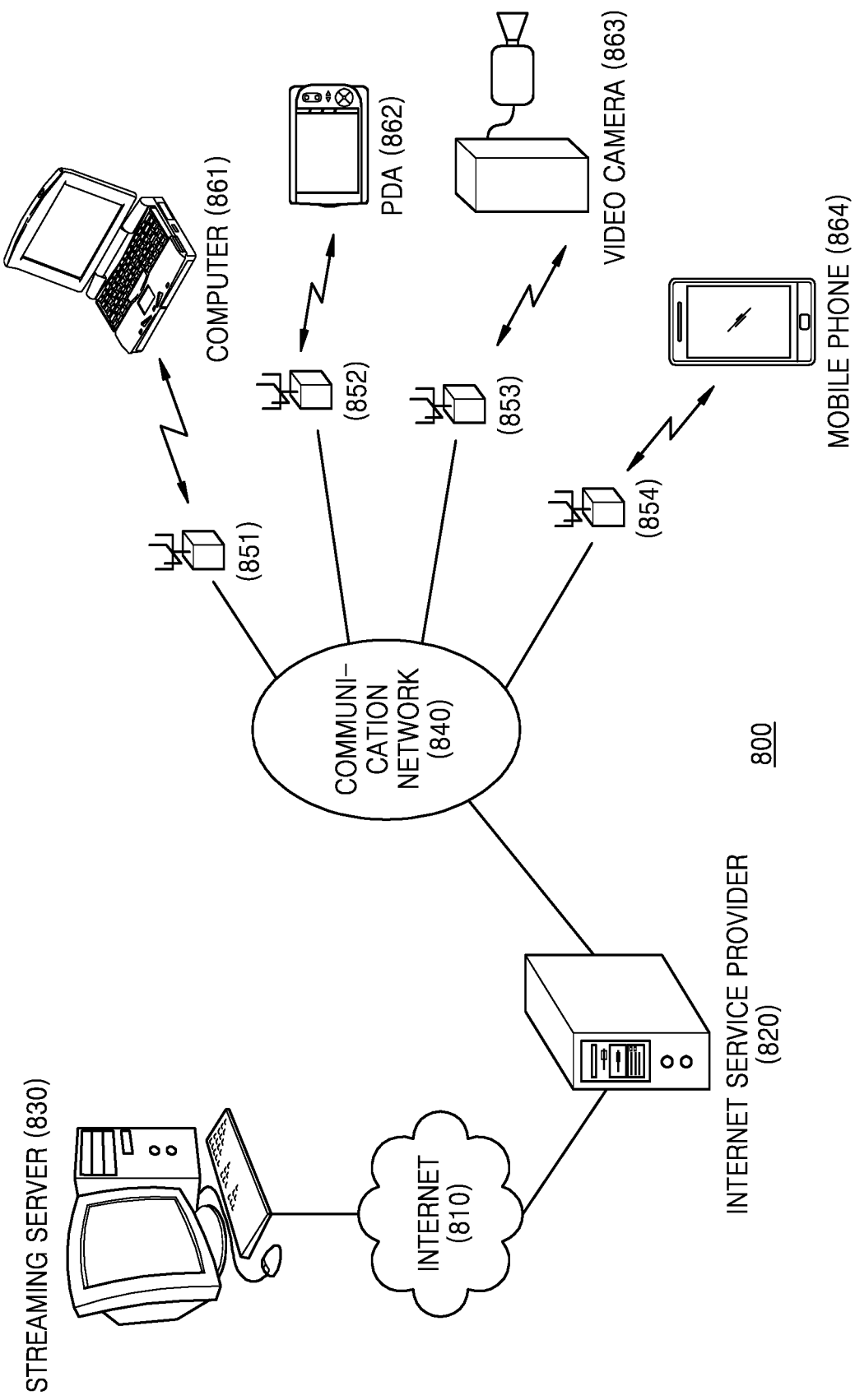
FIG. 20 illustrates an overall structure of a content providing system including a mobile apparatus employing an image processing system according to an embodiment of the inventive concept.

FIG. 20 illustrates an overall structure of a content providing system 800 including a mobile apparatus employing an image processing system according to an embodiment of the inventive concept. The content may be various image signals to be processed. A service area of a communication system performing content transmission may be divided into cells of a predetermined size, and radio base stations 851 to 854 may be installed respectively in the cells.

The content providing system 800 may include a plurality of independent devices. For example, independent devices such as a computer 861, a personal digital assistant (PDA) 862, a video camera 863, and a mobile phone 864 may be connected to the Internet 810 through an Internet service provider 820, a communication network 840, and the radio base stations 851 to 854. The content providing system 800 is not limited to the structure illustrated in FIG. 20, and devices may be selectively connected thereto. The independent devices may be directly connected to the communication network 840 without being connected through the radio base stations 851 to 854.

The video camera 863 is an image capturing device such as a digital video camera that may capture a video image. The mobile phone 864 may use at least one communication scheme among various protocols, such as a Personal Digital Communications PDC (PDC) scheme, a code division multiple access (CDMA) scheme, a wideband code division multiple access (W-CDMA) scheme, a Global System for Mobile Communications (GSM) scheme, and a Personal Handyphone System (PHS) scheme.

Content generated from the devices such as the PDA 862, the video camera 863, and the mobile phone 864 may be transmitted to a streaming server 830 through the radio base stations 852, 853, and 854 and the communication network 840. Also, content stored in the computer 861 may be transmitted to the streaming server 830 through the radio base station 851 and the communication network 840. The streaming server 830 may stream/transmit content transmitted by a user by real-time broadcasting.

In the content providing system 800 according to an embodiment, content recorded by the PDA 862, the video camera 863, the mobile phone 864, or other devices may be encoded in a relevant device, and the encoded content may be transmitted to the streaming server 830. The streaming server 830 may stream/transmit content to other devices requesting the content. The devices receiving encoded content may decode the received content and play the decoded content or provide the decoded content to the outside.

The image processing system according to an embodiment of the inventive concept (e.g. SoCs, application processors, codecs or the image processing systems disclosed herein) may be provided in the computer 861, the PDA 862, the video camera 863, the mobile phone 864, and the like. As an example, the image processing system according to an embodiment of the inventive concept may be implemented in the form of an SoC, and the SoC may be installed in the computer 861, the PDA 862, the video camera 863, the mobile phone 864, and the like. Also, the function of the image processing system according to an embodiment of the inventive concept may be included in an application processor, and the application processor may be installed as a main processor in the computer 861, the PDA 862, the video camera 863, the mobile phone 864, and the like.

Figure 21:
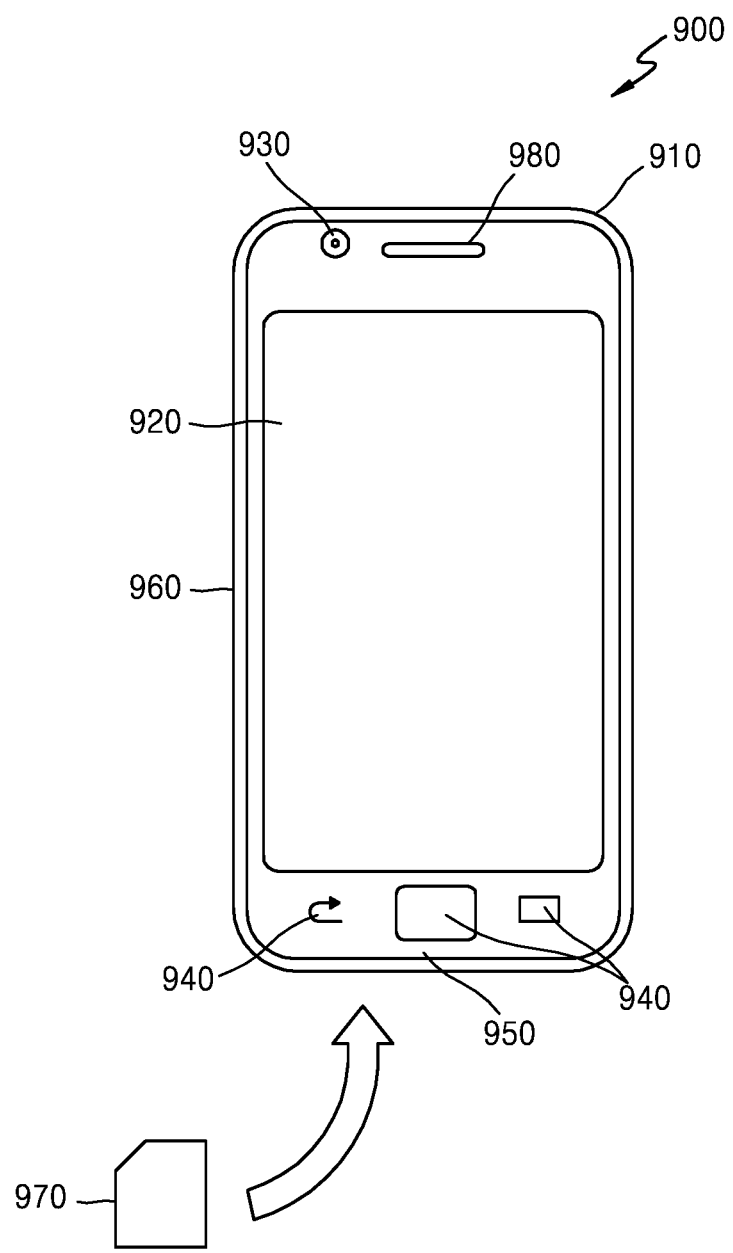
FIG. 21 illustrates an example of a mobile terminal equipped with an image processing system according to an embodiment of the inventive concept.

FIG. 21 illustrates an example of a mobile terminal 900 equipped with an image processing system according to an embodiment of the inventive concept (e.g. SoCs, application processors, codecs or the image processing systems disclosed elsewhere herein). The mobile terminal 900 of FIG. 21 may correspond to the mobile phone 864 illustrated in FIG. 20. The mobile terminal 900 may be equipped with the image processing system as an SoC or an application processor (e.g. SoC 100). The functions of the mobile terminal 900 are not limited, and the mobile terminal 900 may be a tablet or smart phone that may significantly change or extend the functions through an application program. The mobile terminal 900 includes an antenna 910 and a display device 920, such as a liquid crystal display (LCD) or an organic light-emitting diode (OLED) display, for displaying images captured by a camera 930 or images received through the antenna 910. The mobile terminal 900 may include an operation panel 940 including a touch panel and a control button. Also, when the display device 920 includes a touchscreen, the operation panel 940 may further include a touch sensing panel of the display device 920. The mobile terminal 900 includes a speaker 980 or other types of sound output units for outputting voice and sound and a microphone 950 or other types of sound input units for inputting voice and sound. The mobile terminal 900 further includes the camera 930, such as a CCD or a CIS, for capturing a video image and a still image. Also, the mobile terminal 900 may include a storage medium 970 for storing encoded or decoded data such as video images or still images that are captured by the camera 930 or received through an e-mail, and a slot 960 for attaching the storage medium 970 to the mobile terminal 900. The storage medium 970 may be an SD card or other types of flash memories such as an electrically erasable and programmable read only memory (EEPROM) embedded in a plastic case.

While the inventive concept has been particularly shown and described with reference to exemplary embodiments thereof, it will be understood that various changes in form and details may be made therein without departing from the spirit and scope of the following claims. The language of the claims should be referenced in determining the requirements of the invention.

What is claimed is:

1. A method of processing image data, comprising:
receiving a frame of first image data comprising a plurality of pixels each having a corresponding first pixel value including M first bits and N second bits, the M first bits being the more significant bits of the first pixel value and the N second bits being the less significant bits of the first pixel value as compared to the M first bits;
performing dithering on the frame of first image data using the M first bits and the N second bits of each of the first pixel values to obtain a frame of dithered image data, the frame of dithered image data comprising a plurality of pixels each having a corresponding second pixel value comprising M first bits and N second bits; and
providing only the M first bits of the second pixel values of the plurality of pixels of the dithered image data to a display.

2. The method of claim 1, further comprising transmitting the M first bits and the N second bits of the second pixel values of the plurality of pixels of the frame of dithered image data to a processor.

3. The method claim 2, wherein the processor is a codec.

4. The method of claim 3, wherein the codec performs an inverse-dithering on the frame of dithered image data.

5. The method of claim 1, further comprising:
storing the M first bits of the second pixel values of the plurality of pixels of the frame of dithered image data in first locations of a memory; and
storing the N second bits of the second pixel values of the plurality of pixels of the frame of dithered image data in second locations of a memory,
wherein the first locations of the memory are identified by first addresses and the second locations of the memory are identified by second addresses.

6. The method of claim 5, wherein each of the first locations stores only M first bits of the second pixel value of only one corresponding pixel of the plurality of pixels of the frame of dithered image data.

7. The method of claim 6, wherein each of the second locations stores plural sets of N bits of corresponding pixel values of the plurality of pixels of the frame of dithered image data.

8. The method of claim 7, wherein each of the first addresses and second addresses identifies a minimum accessible memory unit of the memory.

9. The method of claim 5, further comprising accessing the memory via a K×M bit bus, where K is a positive integer.

10. The method of claim 9, wherein K is an integer equal to or greater than 2, and the method further comprises transmitting in parallel K sets of M bits of corresponding pixel values of corresponding pixels of the plurality of pixels of the frame of dithered image data.

11. The method of claim 1, wherein at least some of the pixel values of the plurality of pixels of the frame of first image data and corresponding ones of the pixel values of the plurality of pixels of the frame of dithered image data are the same.

12. The method of claim 1, wherein the N second bits of the second pixel values of the plurality of pixels of the frame of dithered image data are the same as the N second bits of the first pixel values of the plurality of pixels of the frame of first image data.

13. The method of claim 12, further comprising:
discarding the M first bits of the plurality of pixels of the frame of first image data; and
restoring the frame of first image data by processing the frame of dithered image data.

14. The method of claim 12, further comprising restoring the frame of first image data by performing an inverse-dithering operation on the frame of dithered image data.

15. The method of claim 14, wherein restoring the frame of first image data comprises combining the N second bits of the second pixel values of the plurality of pixels of the frame of dithered image data and M first bits of pixel values obtained from the inverse-dithering operation.

16. The method of claim 14, further comprising performing a process with a next frame of image data using the restored frame of first image data as a reference image.

17. The method of claim 16, wherein performing a process with the next frame of image data comprises motion estimation.

18. The method of claim 1,
wherein for each pixel of at least some of the plurality of pixels, the M first bits of the first pixel value is different from the M first bits of the second pixel value, and
wherein for each pixel of all of the plurality of the pixels, the N second bits of the first pixel value is the same as the N second bits of the second pixel value.

\* \* \* \* \*